A. H. WOODWARD.
MOTOR DRIVEN COIN REGISTER.
APPLICATION FILED AUG. 25, 1916.
1,372,857.
Patented Mar. 29, 1921.
20 SHEETS—SHEET 2.
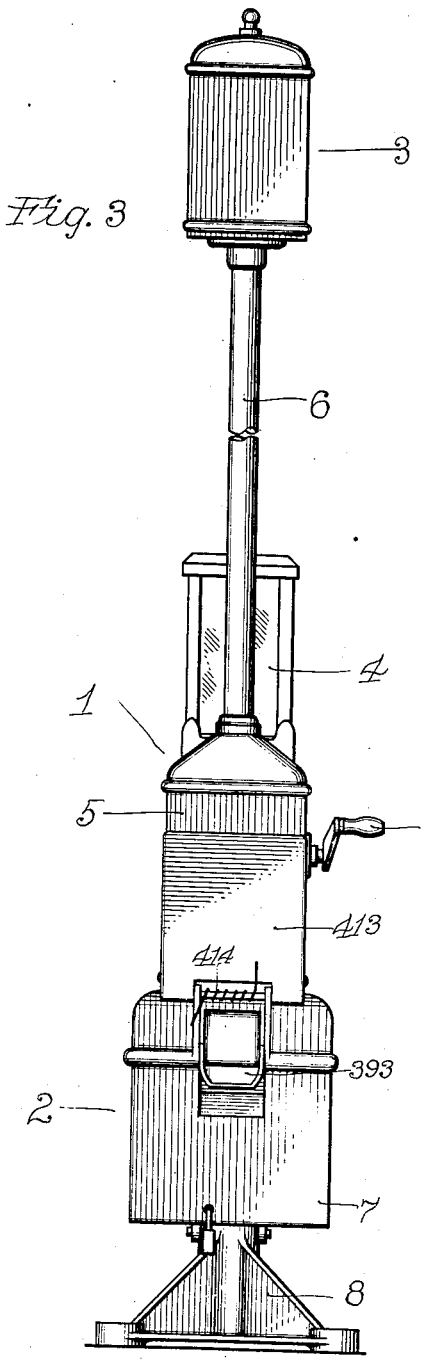
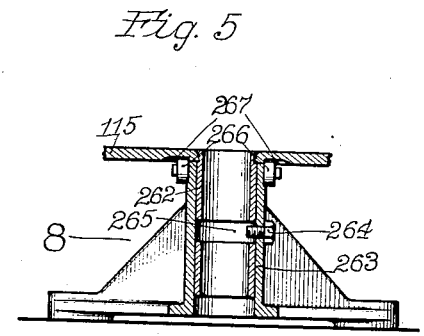
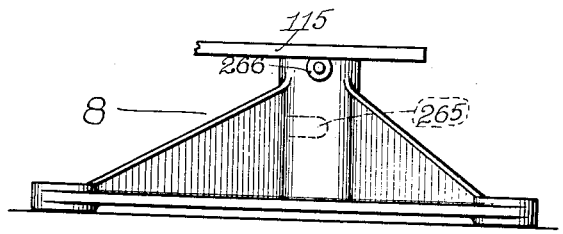
Inventor
Arthur H. Woodward
By Brown, Hanson & Bottcher
Attys.

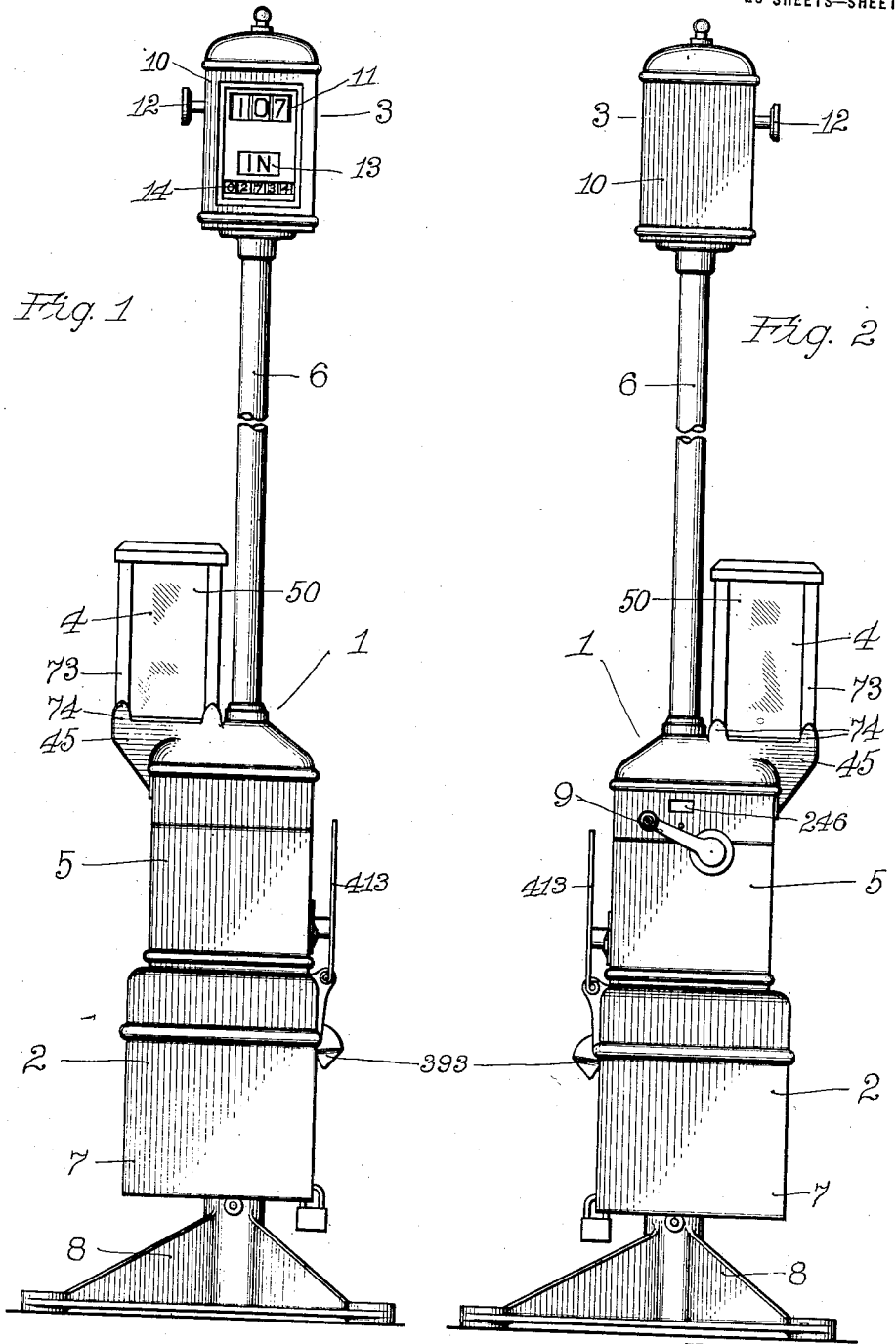

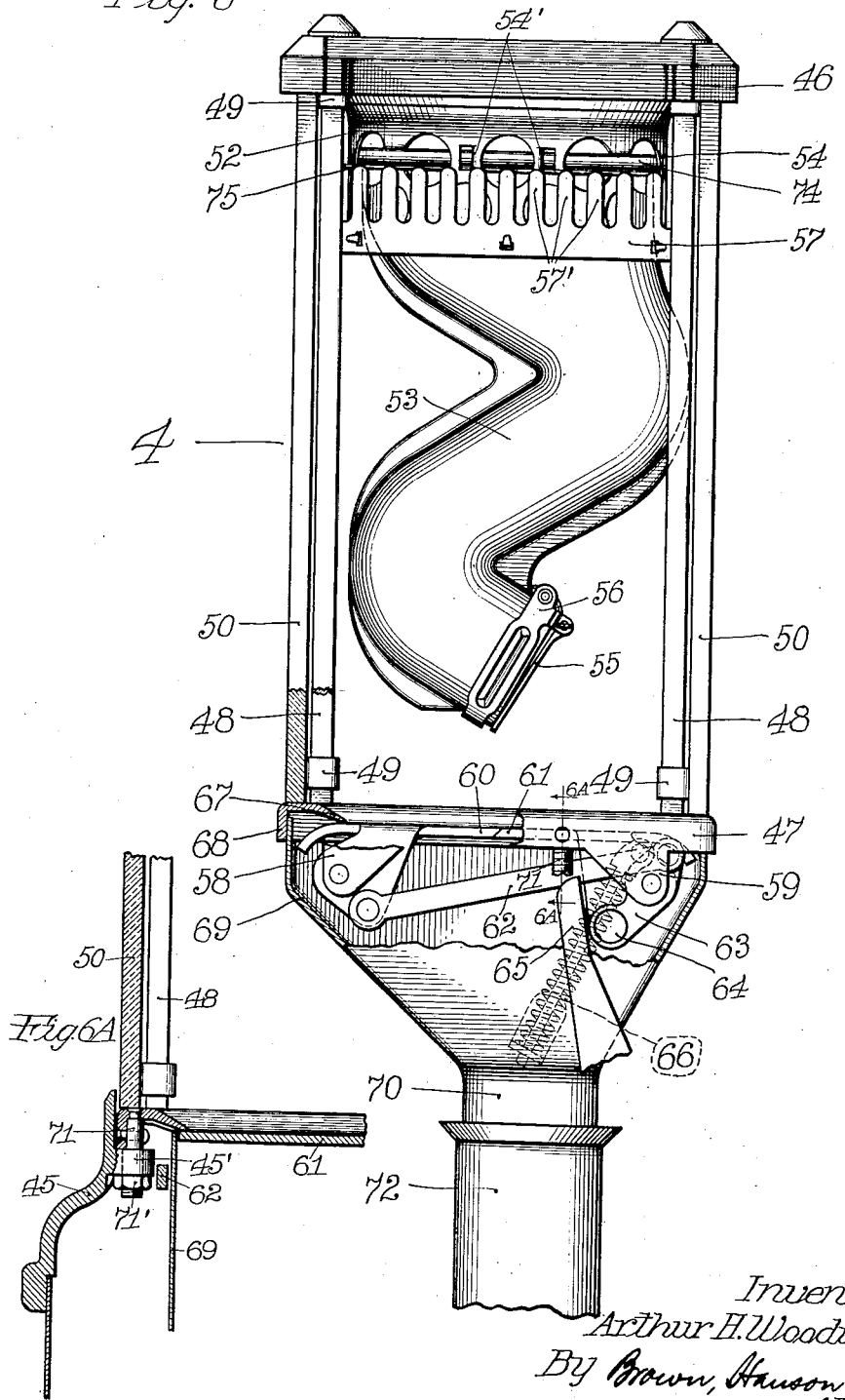

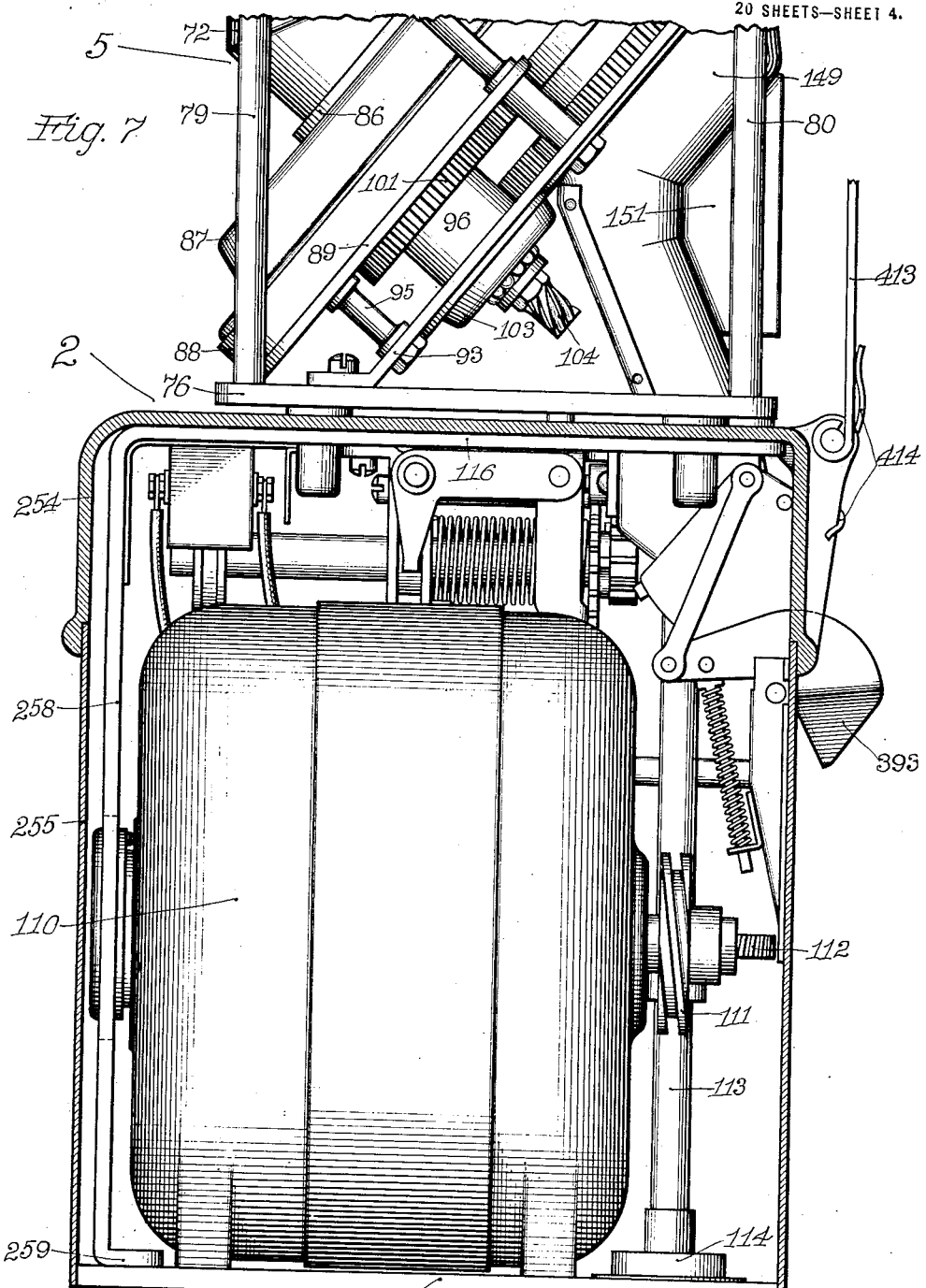

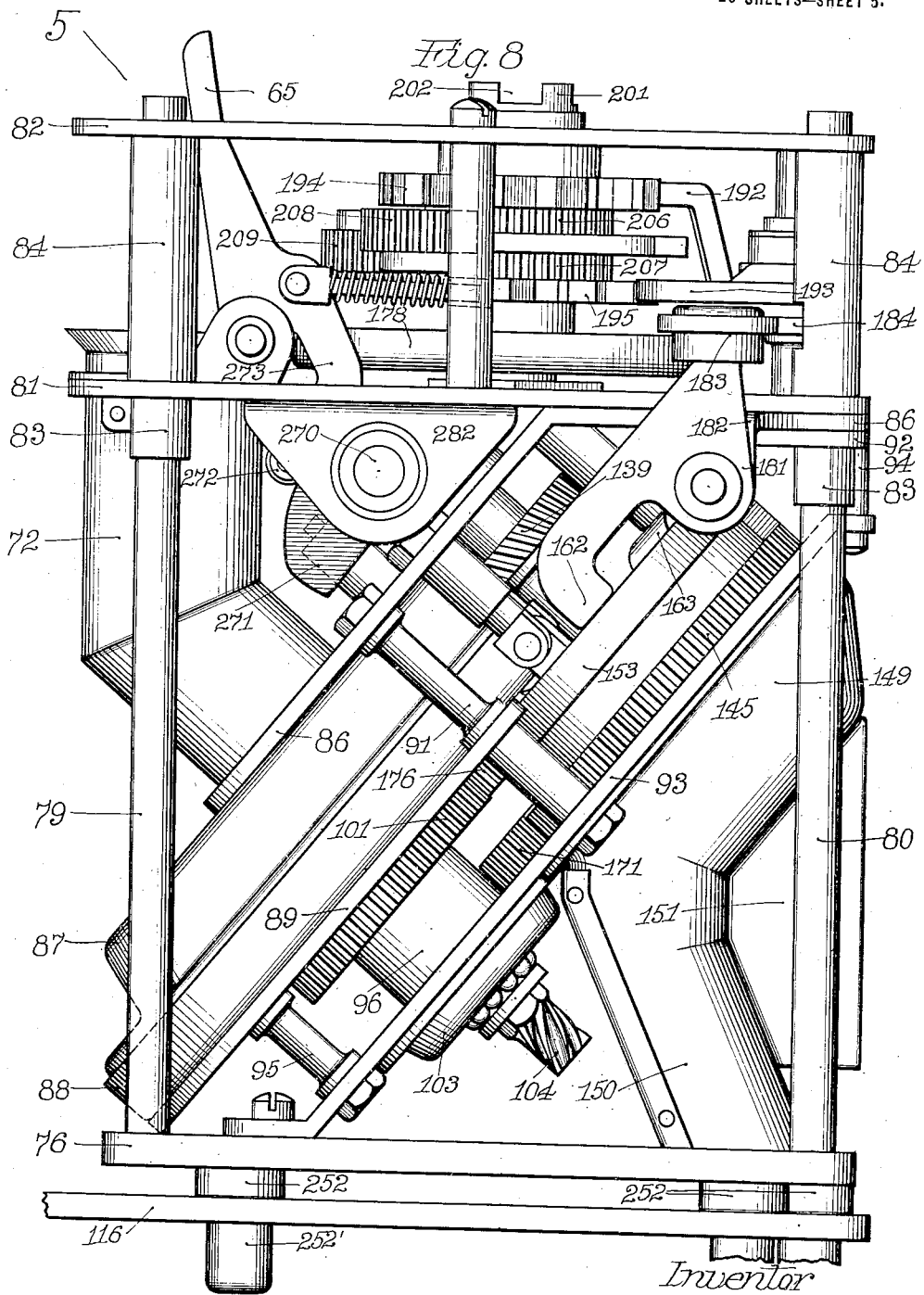

A. H. WOODWARD.
MOTOR DRIVEN COIN REGISTER.
APPLICATION FILED AUG. 25, 1916.
1,372,857.
Patented Mar. 29, 1921.
20 SHEETS—SHEET 6.
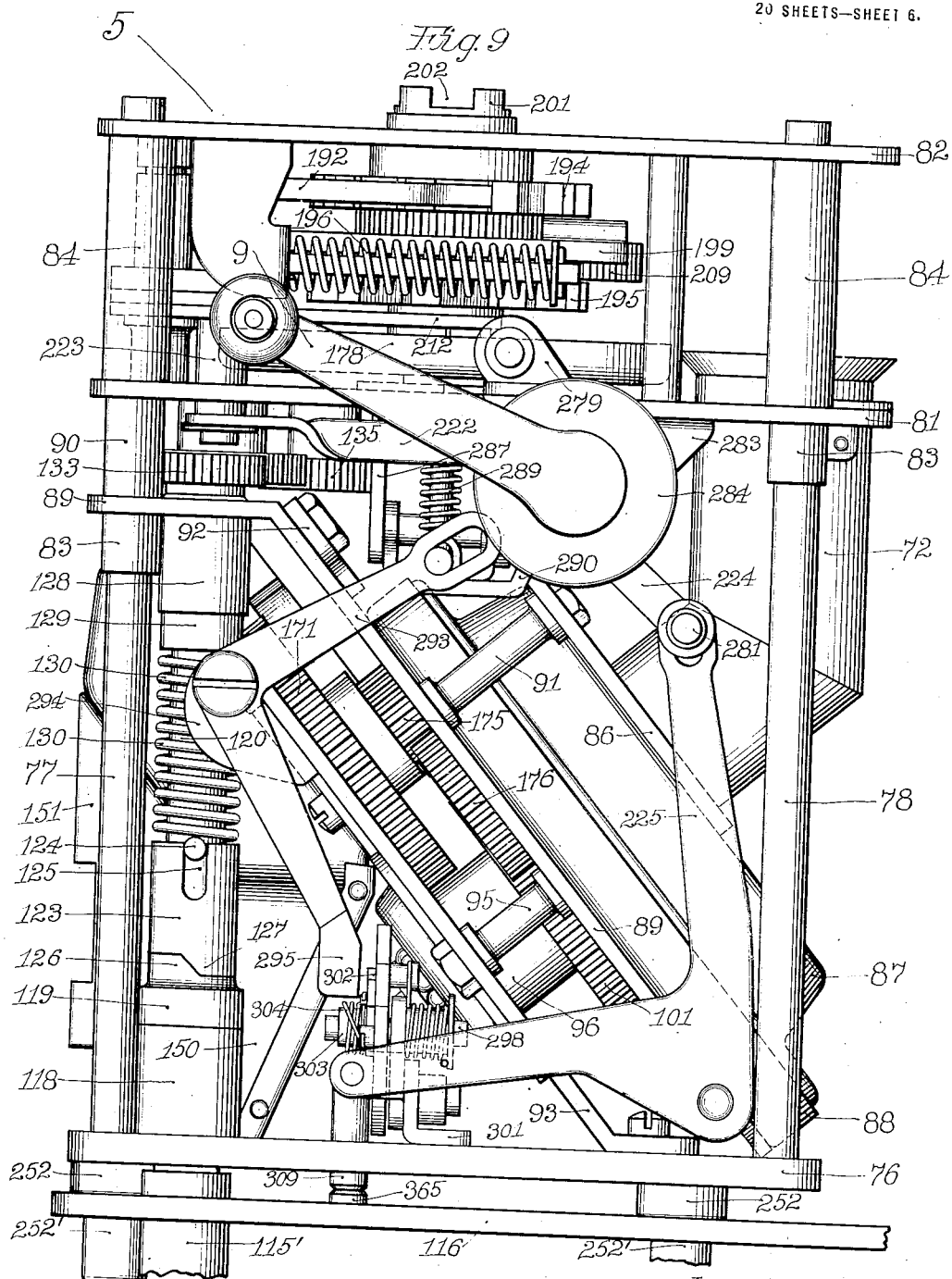
Inventor
Arthur H. Woodward
By Brown, Hanson & Boettcher
Attys

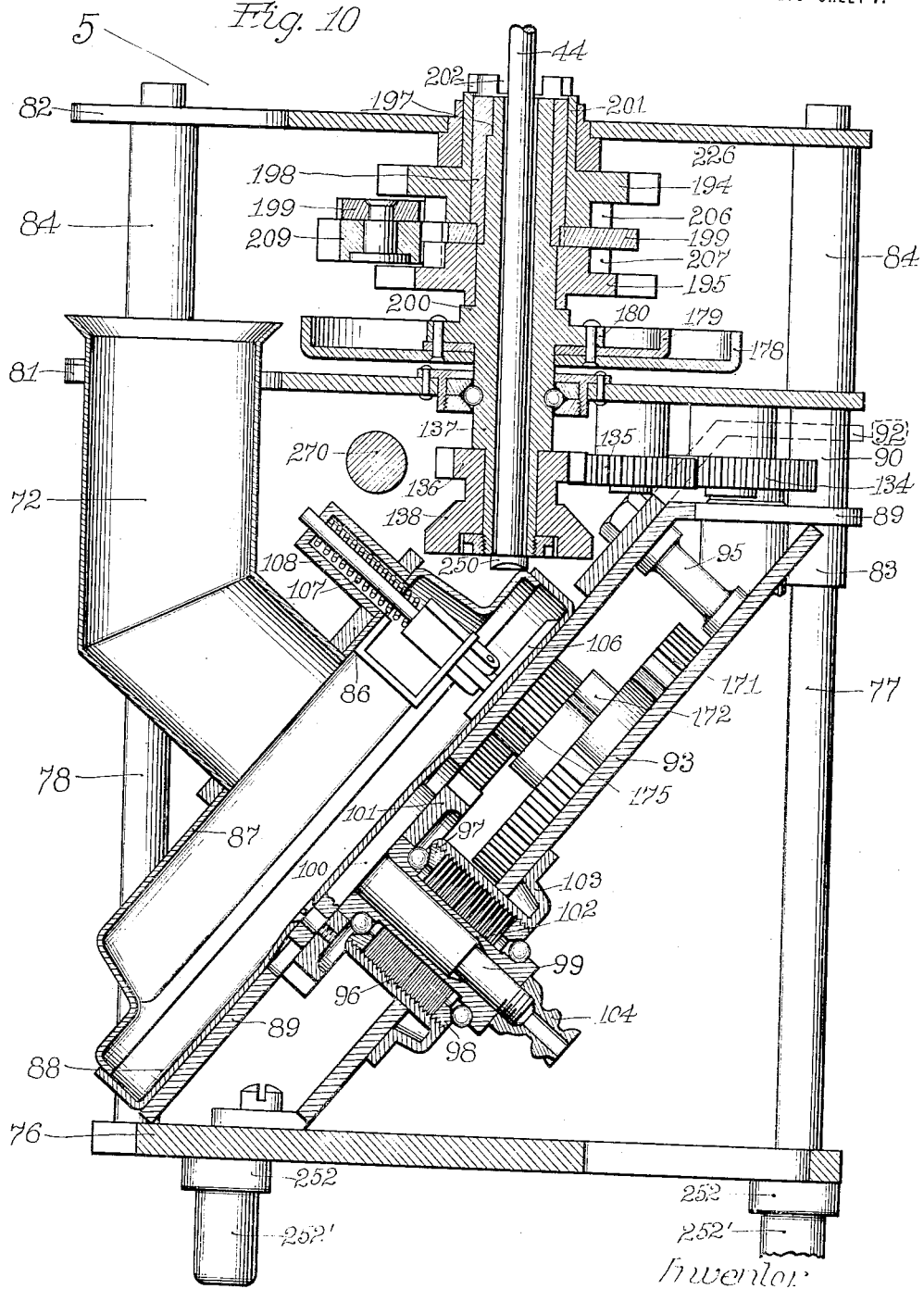

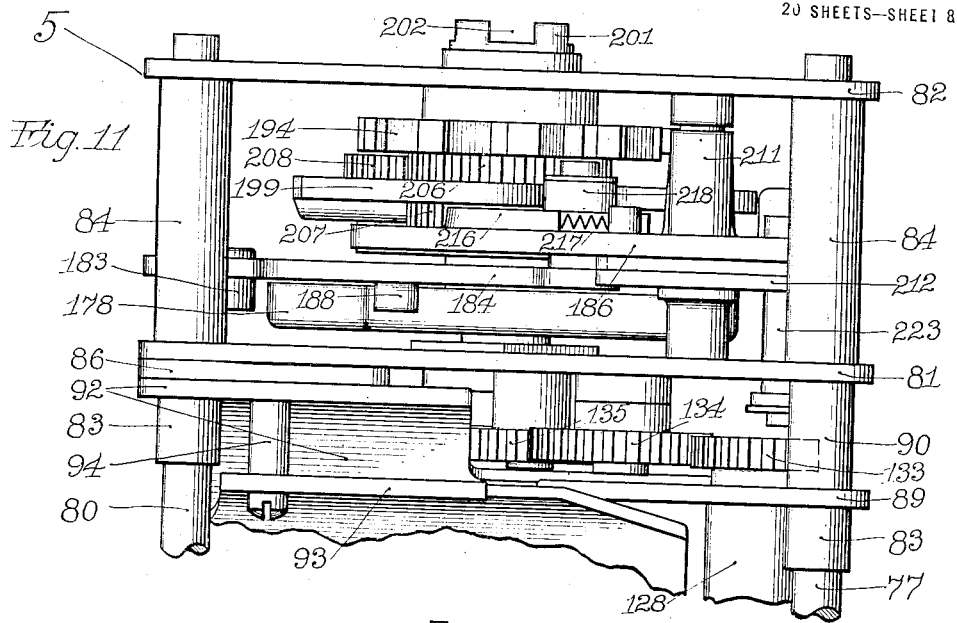
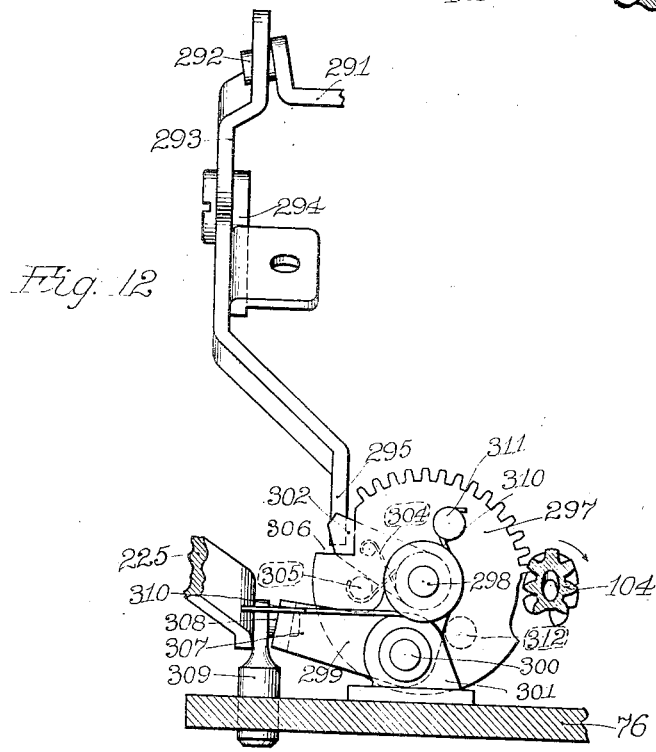

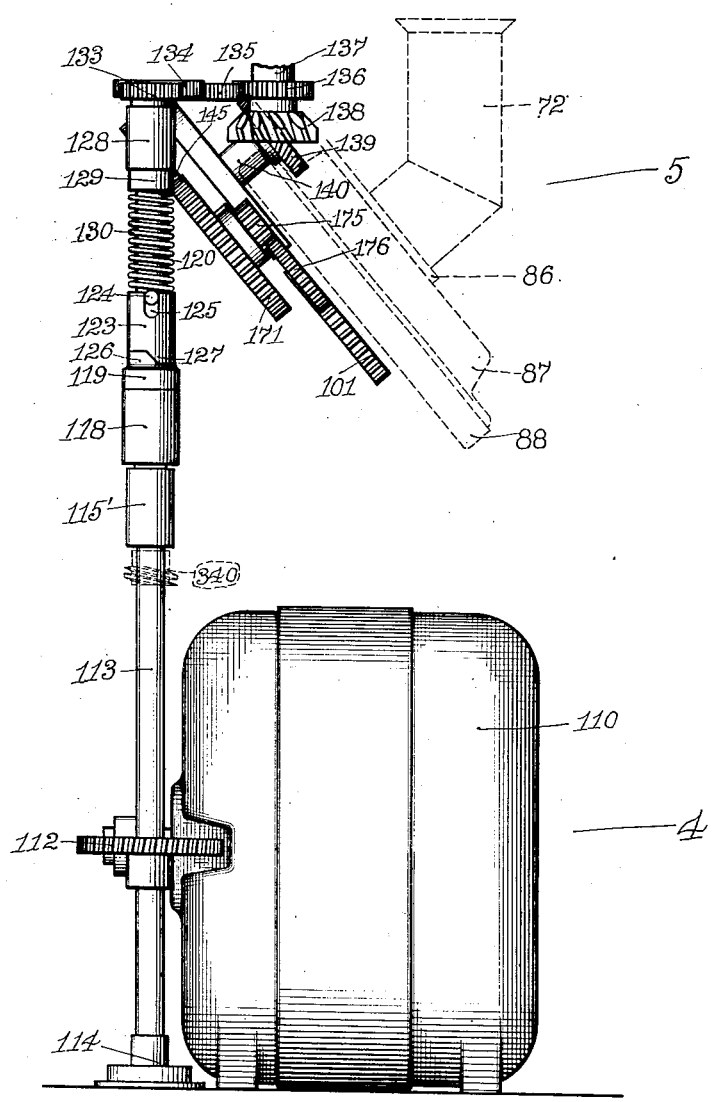

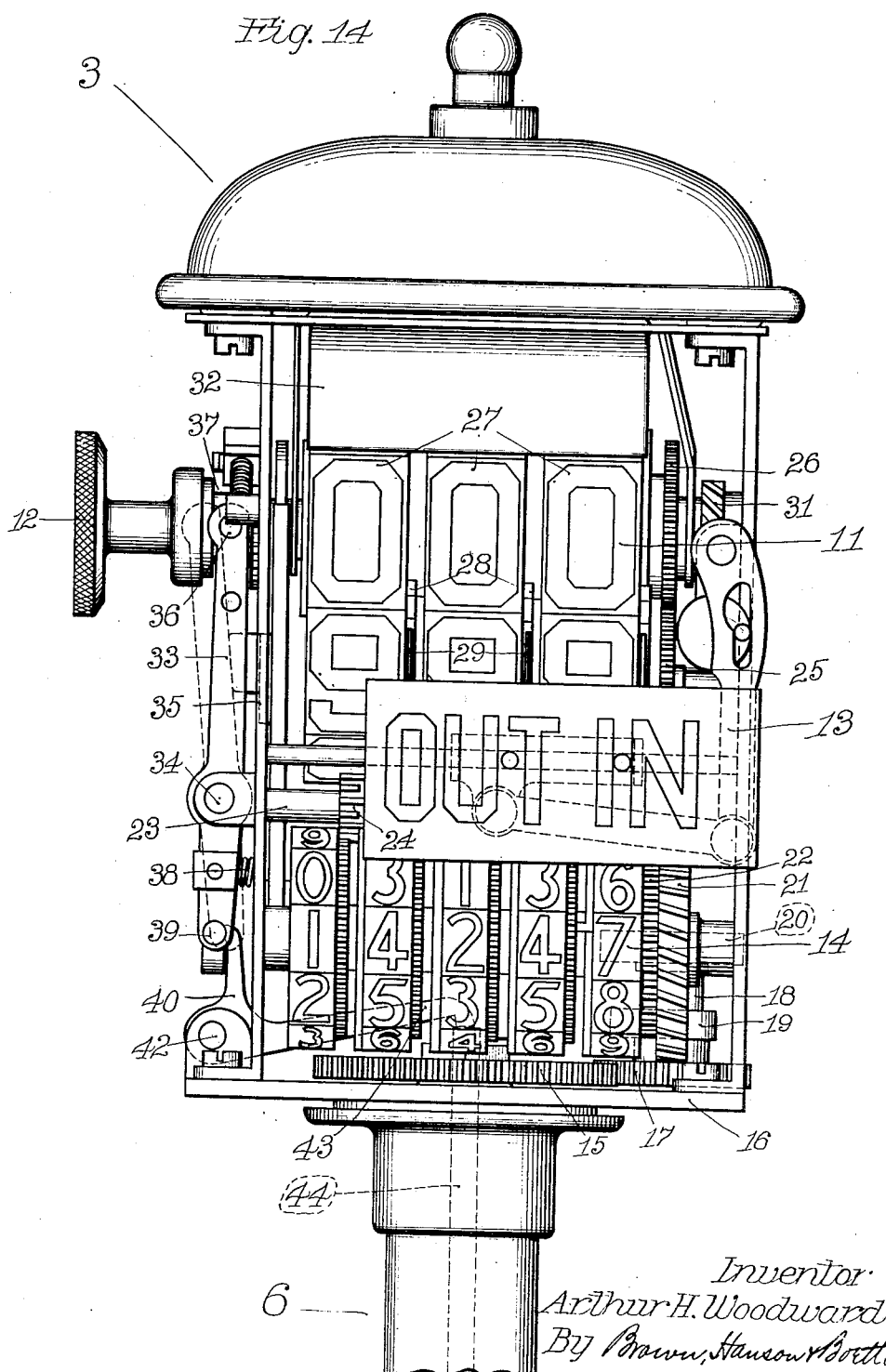

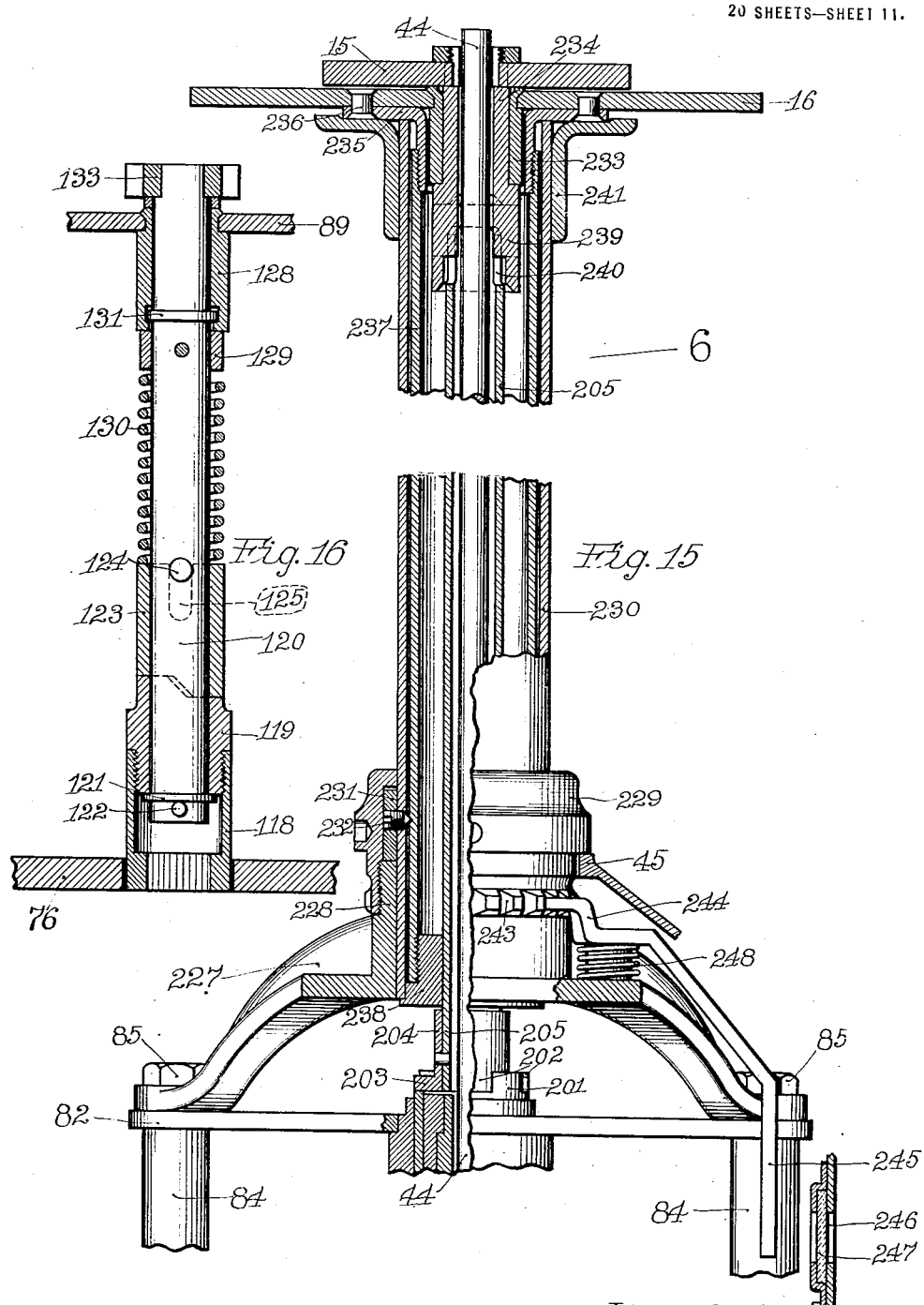

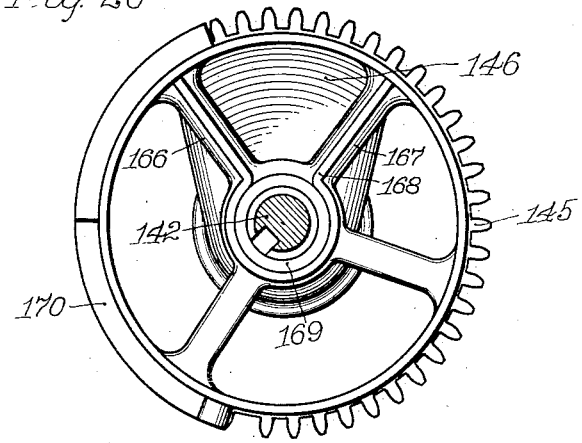
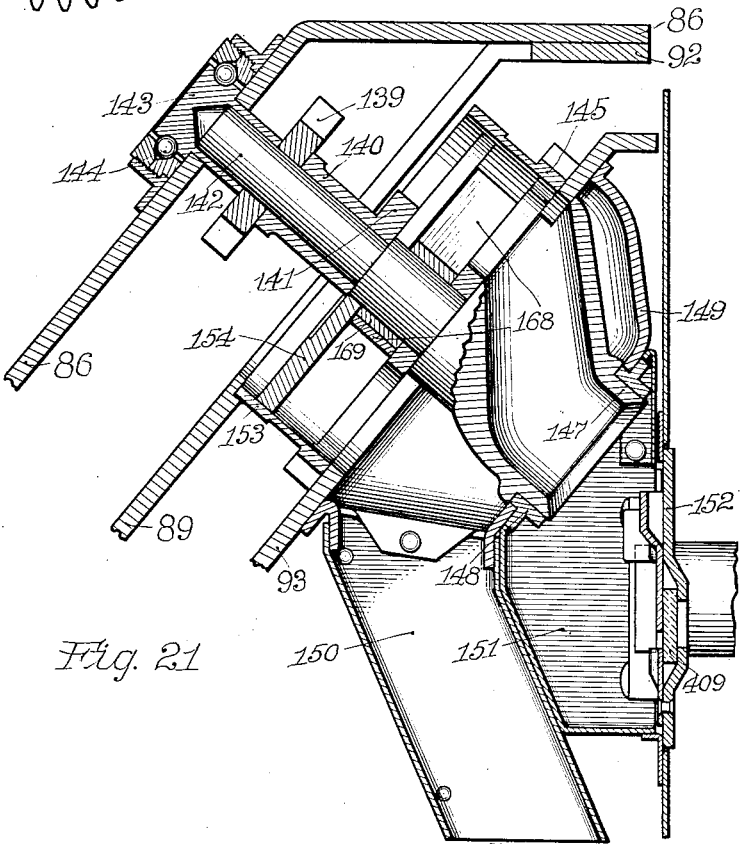

A. H. WOODWARD.
MOTOR DRIVEN COIN REGISTER.
APPLICATION FILED AUG. 25, 1916.
1,372,857.
Patented Mar. 29, 1921.
20 SHEETS—SHEET 14.
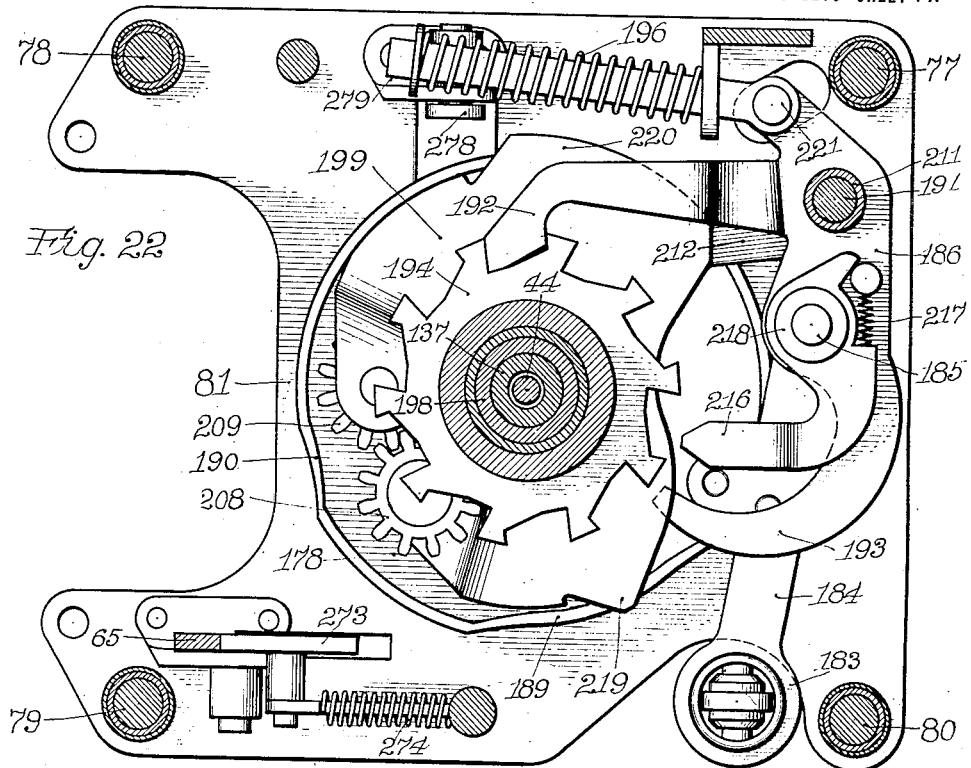
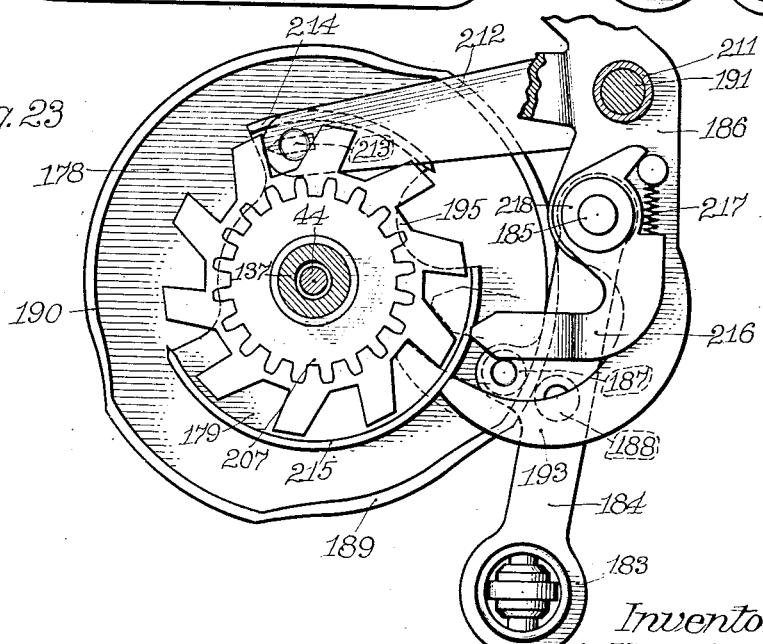
Inventor
Arthur H. Woodward
By Brown, Hanson & Boettcher
Attys

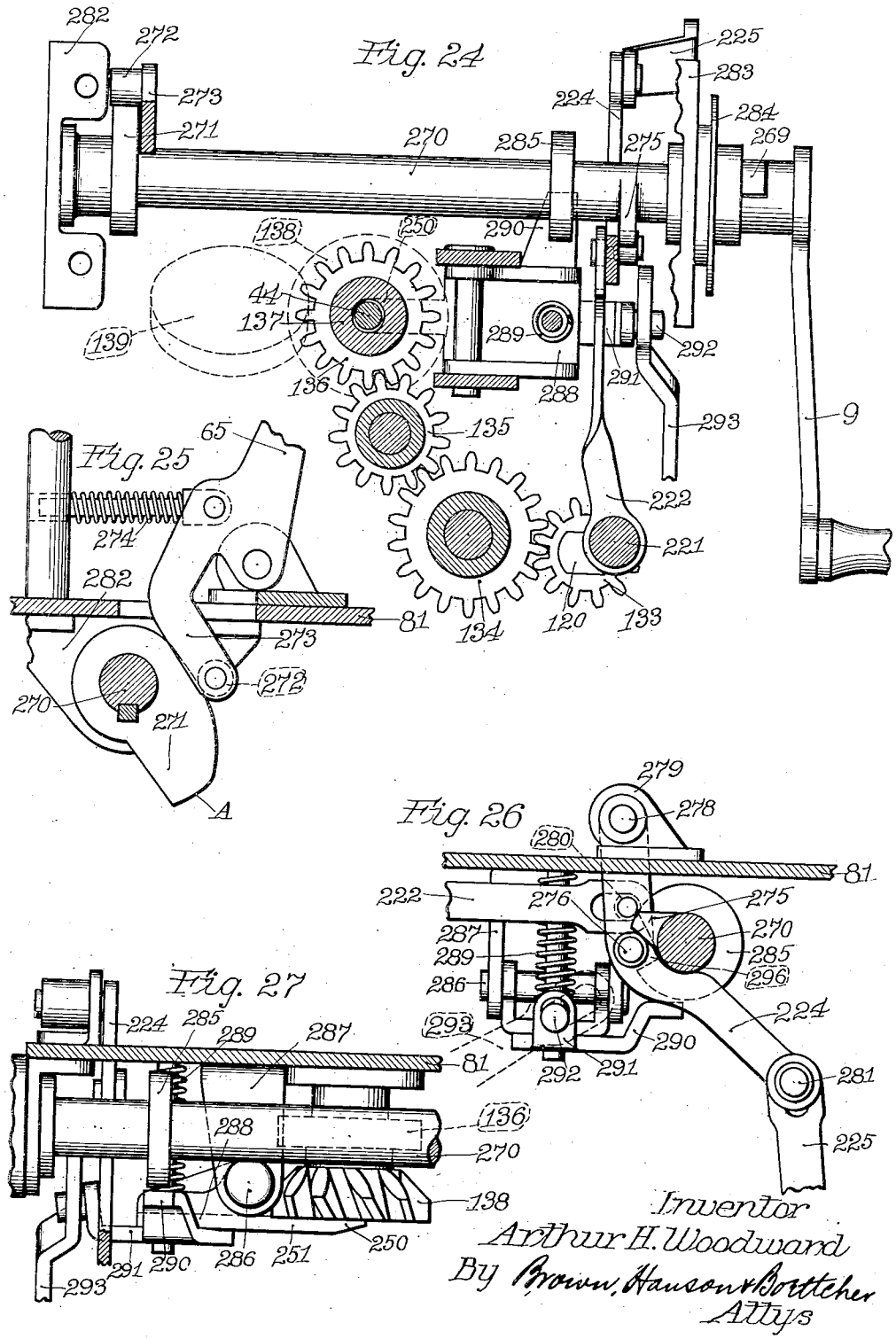

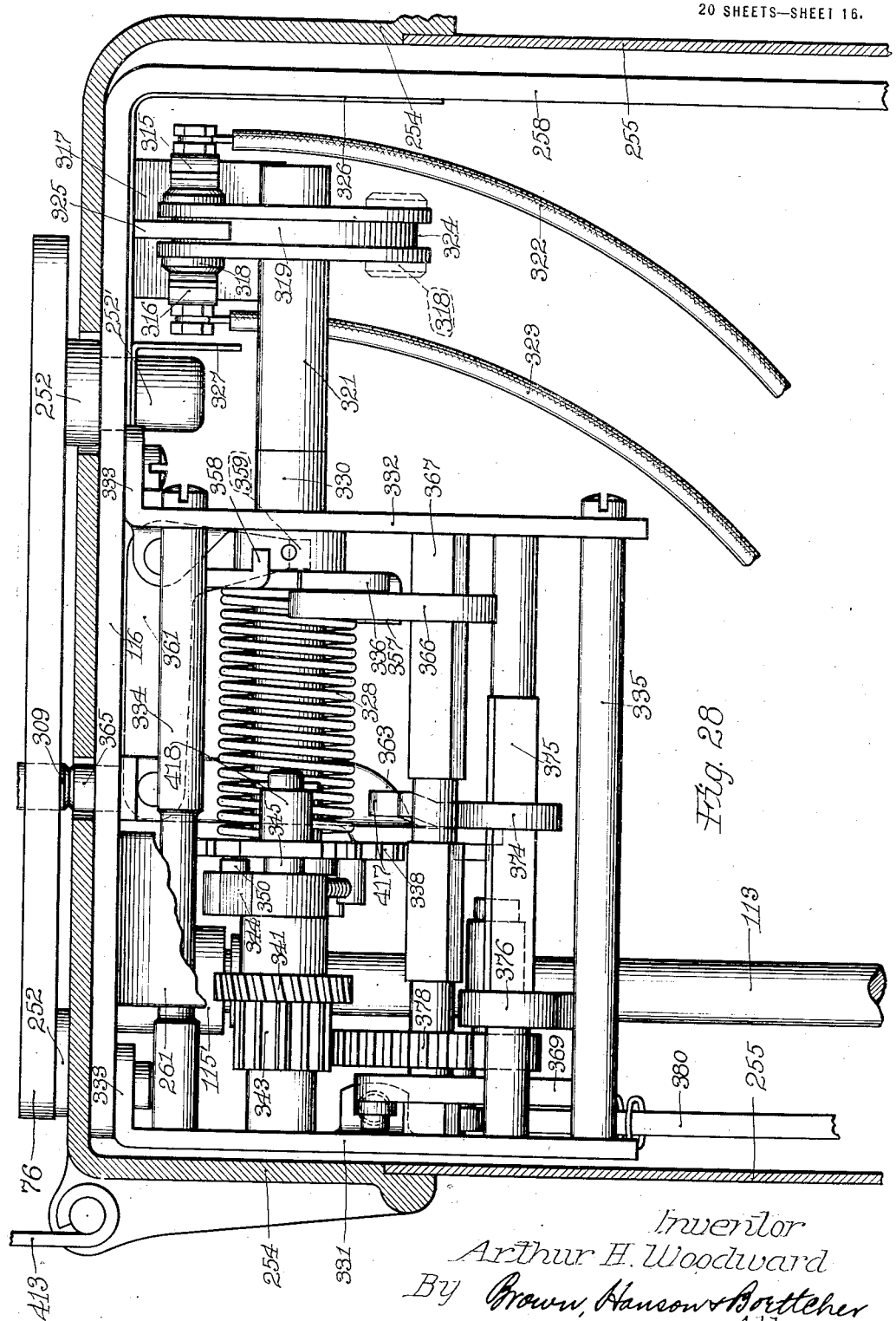

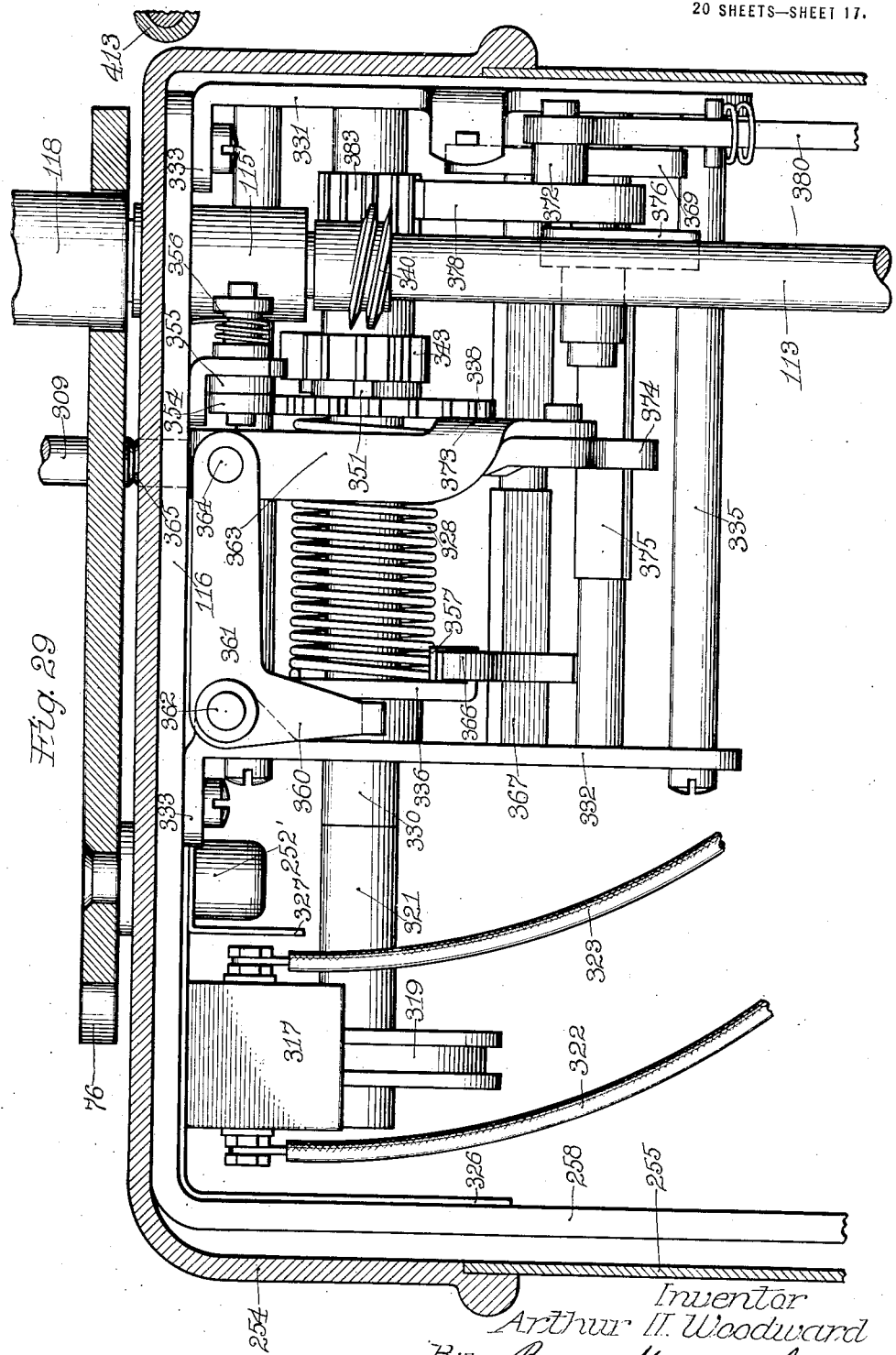

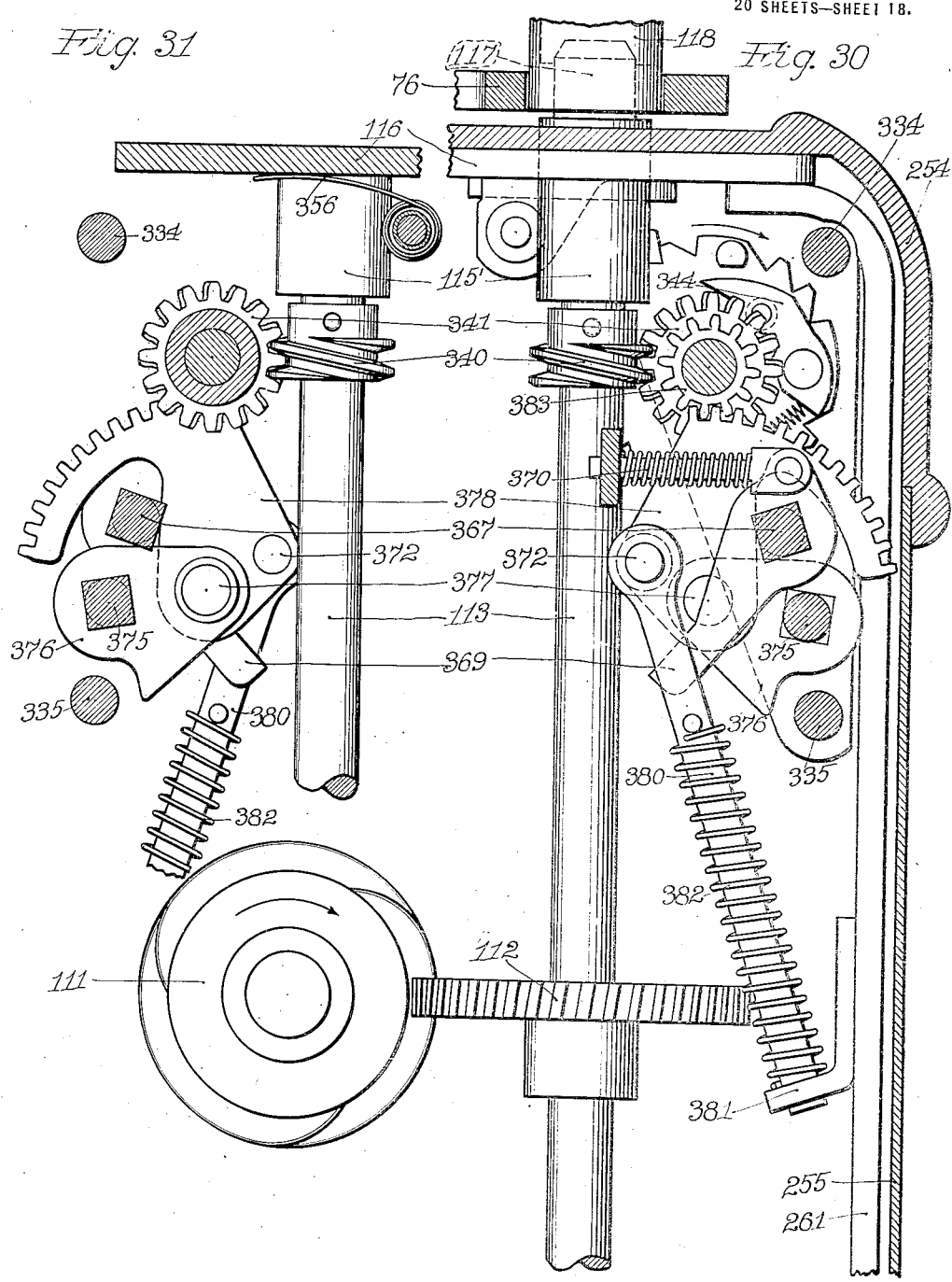

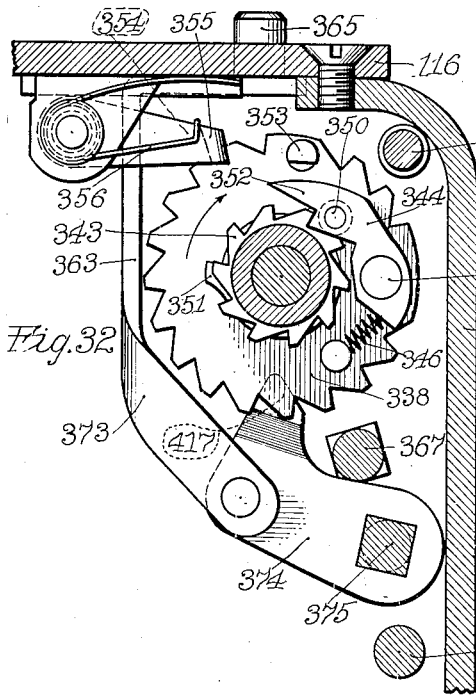
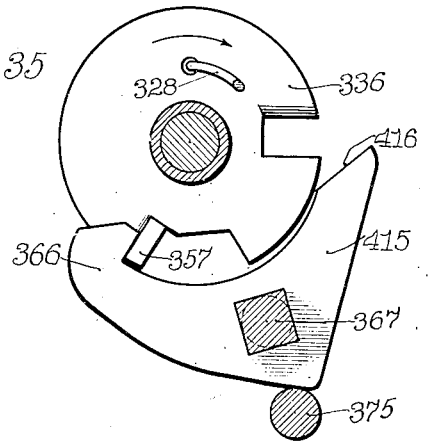
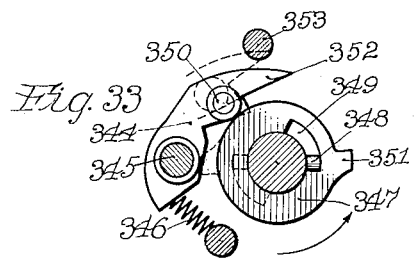
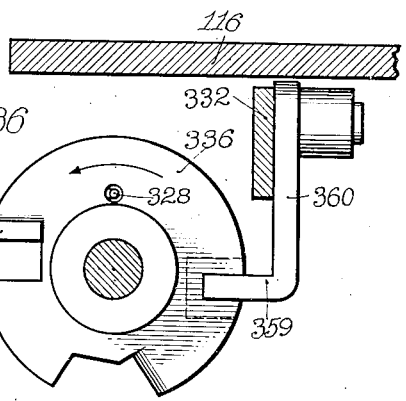
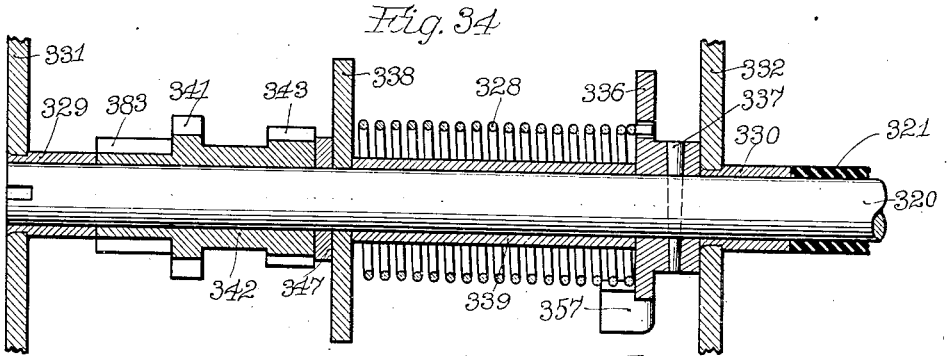

A. H. WOODWARD.
MOTOR DRIVEN COIN REGISTER.
APPLICATION FILED AUG. 25, 1916.

1,372,857.   Patented Mar. 29, 1921.
20 SHEETS—SHEET 20.

Inventor
Arthur H. Woodward
By Brown, Hanson & Boettcher,
Attys.

UNITED STATES PATENT OFFICE.

ARTHUR H. WOODWARD, OF ALTADENA, CALIFORNIA, ASSIGNOR, BY MESNE ASSIGNMENTS, TO JOHNSON FARE BOX COMPANY, OF CHICAGO, ILLINOIS, A CORPORATION OF NEW YORK.

MOTOR-DRIVEN COIN-REGISTER.

1,372,857.    Specification of Letters Patent.    Patented Mar. 29, 1921.

Application filed August 25, 1916. Serial No. 116,860.

*To all whom it may concern:*

Be it known that I, ARTHUR H. WOODWARD, a citizen of the United States, residing at Altadena, in the county of Los Angeles and State of California, have invented a certain new and useful Improvement in Motor-Driven Coin-Registers, of which the following is a full, clear, concise, and exact description, reference being had to the accompanying drawings, forming a part of this specification.

This invention relates to coin registers.

In studying the operation of coin registers, I have found that it is often desirable to relieve the attendant, or "conductor" of the work of operating the coin evaluating and registering mechanism, as the same involves not only considerable labor where the coin receipts or fares are particularly heavy, but requires the attention of the operator until all the coins are rung up.

Where hand operated machines of this class are employed on street cars or the like, especially cars of the "pay-as-you-enter" type, I have observed that the duties of the operator, that is the conductor, require that he pay close attention to a number of acts or duties, each of which may require his attention at the same time. He is required to see to the loading of the car, that is proper entry of the passengers to the platform and from the platform to the body of the car, signaling the motorman to start, and seeing that each passenger deposits his fare.

A person of average ability can pay close attention to only one thing at a time and, where a number of concurrent or overlapping actions demand the attention of the conductor, he is likely to err and loss to the company is caused. As it is far more important to prevent accidents than to see that the car is properly loaded, or that each passenger deposits his fare, the company allows the operator or conductor to let the fares collect in the hopper while he watches the patrons mounting the car and signals to the motorman that the car is to be started. If transfers are to be issued, he is then allowed to issue the same and after all these duties are attended to, he operates the machine to register, or "ring up" the coins.

The delay in ringing up the coin promptly is distinctly disadvantageous in that, if a shortage occurs, it will not be detected until it is too late to locate the cause and collect the proper fare. The accumulation of a large mass of coins imposes a severe duty upon the machine and is detrimental to proper operation of the same. It is also a fact that the longer the interval between the time that the coin is deposited and the time that it is rung up, the greater the opportunity for the conductor to steal the fares.

The object of the present invention is to provide a coin register which will relieve the conductor, or other attendant, of the work of manually operating the register, and which will register the coins substantially as they are deposited without requiring much attention on his part.

As the operation of the register does not require the close attention of the conductor, he can start the register when the first passenger enters and then give his chief attention to loading and starting the car. In this manner the objectionable time lag is practically eliminated.

Another object of the invention is to provide a motor driven register, which, after it is started, will continue to operate until all the coins are registered, and then will automatically stop.

Most cars, for obvious reasons, are reversible, that is, can be driven from either end. As each end alternately becomes the entry or receiving platform and it would entail a substantial duplication of apparatus to have a coin register at each end, I provide each end of the car with a suitable motor base and provide a coin evaluating and registering mechanism which is separable from the motor base and can be carried from end to end and placed on the proper base, as is required.

Another object is the provision of suitable controlling mechanism for starting and stopping the motor. Another object is the provision of suitable interlocking mechanism for interlocking the resetting mechanism of the over-head trip register with the motor-base, the starting switch and the coin evaluating mechanism.

Other objects will be apparent from the following detail description of an embodiment of my invention.

In the accompanying drawings, which form a part of the present specification;—

Figure 1 is a front elevation of the register showing the overhead register facing forward;

Fig. 2 is a rear elevation showing the crank side;

Fig. 3 is a right side elevation showing the coin door;

Fig. 4 is a side view in elevation, of the motor pedestal and base plate;

Fig. 5 is a sectional view of the same; taken at right angles to Fig. 4;

Fig. 6 is a detail view of the coin hopper;

Figure 17:
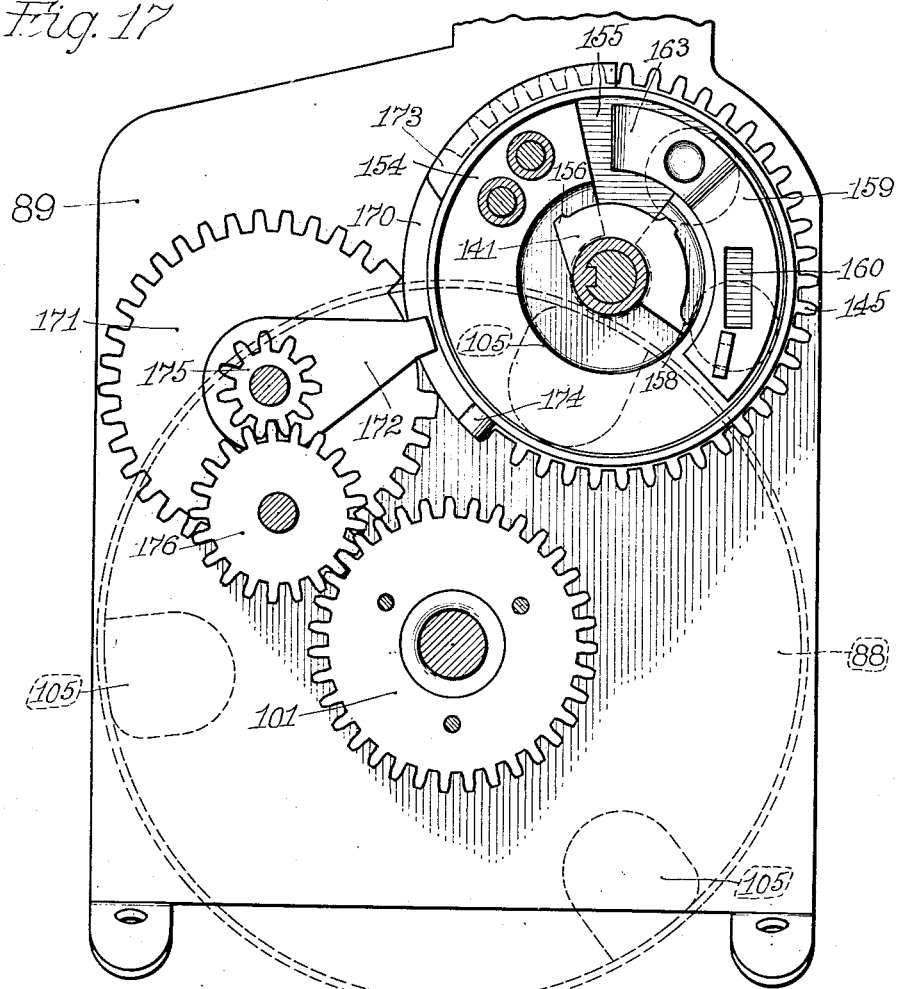
Figure 18:
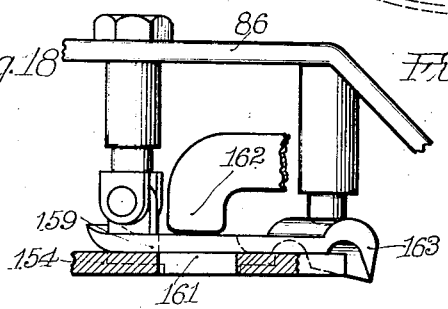
Figure 19:
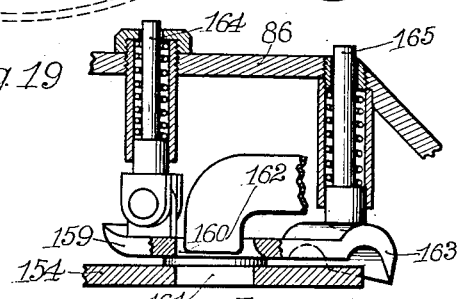
Figure 38:
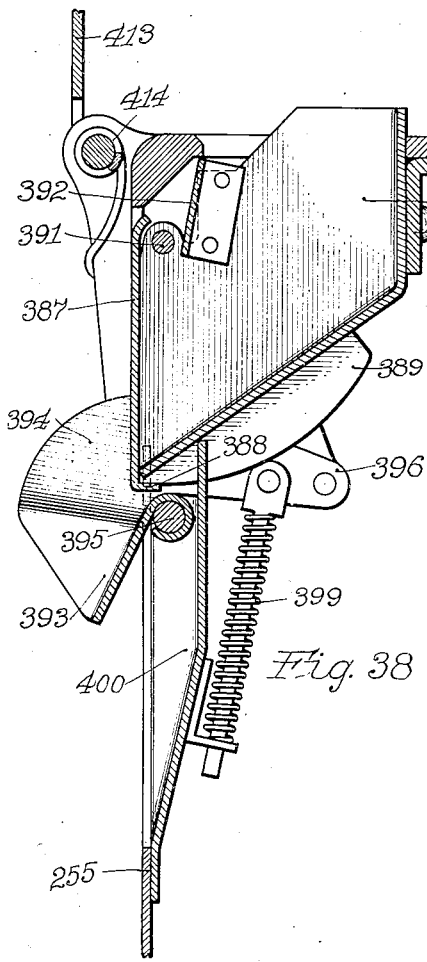
Figure 37:
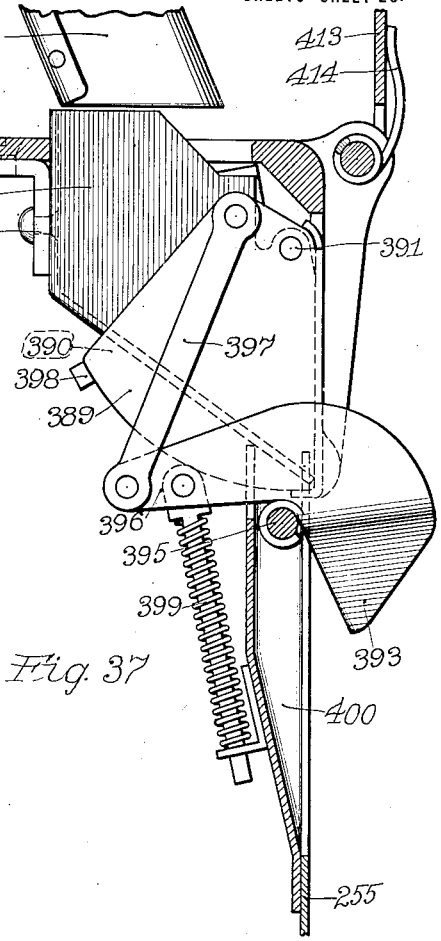
Figure 39:
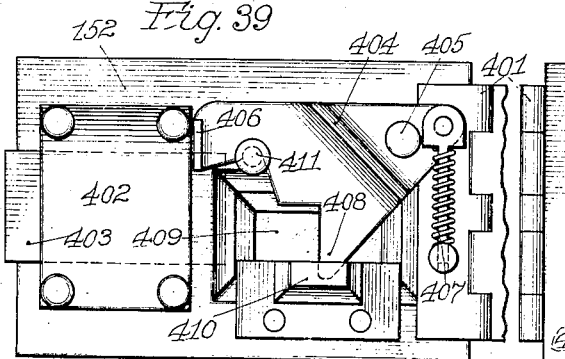
Figure 40:
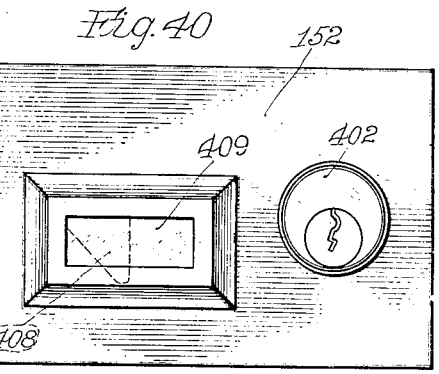

Fig. 6ª is a detail sectional view taken on the line 6ª of Fig. 6;

Fig. 7 is a front elevation, partly in section, of the lower end of the coin evaluating mechanism, and the motor base, showing the motor, the coin delivery chute and the switch and control mechanism;

Fig. 8 is a front elevation of the coin evaluating mechanism;

Fig. 9 is a rear elevation of the same;

Fig. 10 is a vertical section of the same;

Fig. 11 is a right side elevation of the differential clutch mechanism;

Fig. 12 is a dissected view of the seven turn interlock between the coin evaluating mechanism, the tripping handle and the trap doors, the motor base and the resetting means for the overhead register;

Fig. 13 is a dissected view of the driving connection from the motor to the coin evaluating mechanism;

Fig. 14 is a front elevation of the overhead register mechanism, showing the trip register and resetting connections;

Fig. 15 is a cross section of the column and the driving connection between the coin evaluating mechanism and the overhead register;

Fig. 16 is a vertical section of the driving shaft and clutch mechanism between the motor and the coin evaluating mechanism;

Fig. 17 is a plan view of the measuring chamber, driving gears and the coin pan shown in dotted lines;

Fig. 18 is a fragmentary view of the wiper plate and finding finger, showing the latter in raised position;

Fig. 19 is a similar view showing the coin under the wiper and the finding finger descending;

Fig. 20 is a fragmentary view of a part of the coin measuring chamber showing the chute for separating out a certain denomination of coin;

Fig. 21 is a cross section of the coin measuring mechanism showing the separating chutes for separating different denominations of coins, and the container for one denomination of coins;

Fig. 22 is a plan view of the differential cam and clutch mechanism;

Fig. 23 is a plan view of the coin cam and the lower escapement wheel;

Fig. 24 shows in plan view the operating shaft and handle for operating the trap doors and tripping the starting switch;

Fig. 25 is a fragmentary detail view of the cam for operating the trap doors;

Fig. 26 is a fragmentary elevational view of the switch tripping and interlocking mechanism;

Fig. 27 is a fragmentary elevational view of the interlock between the overhead register and the tripping handle;

Fig. 28 is a front elevation of the switch and switch controlling mechanism;

Fig. 29 is a rear elevation of the same;

Fig. 30 is an end elevation of the same from the left of Fig. 28;

Fig. 31 is a sectional elevation from the opposite direction showing the movable center for the sector;

Fig. 32 is an elevational view of the slipping clutch between the switch spring and the winding mechanism;

Fig. 33 is a fragmentary detail view of part of the same;

Fig. 34 is a fragmentary section of the switch shaft and the switch spring for the same;

Fig. 35 is a detail view of part of the switch spring escapement;

Fig. 36 is a view of a coöperating part of the escapement;

Fig. 37 is an elevational view of the delivery chute for coins;

Fig. 38 is a cross sectional view from the opposite direction of the same;

Fig. 39 is a rear elevation of the lock controlling mechanism and door for the special or penny receptacle; and Fig. 40 is a front elevation of the same, showing the frangible seal.

General features.

The particular machine which I am illustrating as a typical embodiment of my invention comprises two general parts—the coin handling mechanism 1, and the driving or motor base mechanism 2, which parts are separable for convenience in handling. A double ended street car is provided with a motor base mechanism 2, at each end of the car, and a single coin handling and registering mechanism 1. It would be needless duplication to have coin handling mechanism at each end, but it is also to be noted that if the motor base 2 and the coin handling mechanism were connected together inseparably, the resulting structure would be too heavy to be conveniently transported by one man. I overcome the difficulty by providing separate motor bases 2 at each end of the car and make the coin handling and registering mechanism 1 of such character that it can readily be transported from end to end of the car and thus be employed to register all of the coins.

The coin handling mechanism comprises the overhead register 3, the coin receiving and inspection hopper 4, the coin evaluating mechanism 5, and the column 6 which supports the overhead register mechanism 3 and contains the driving connection and an interlocking connection between these two parts.

The motor base 2 comprises a casing 7 which contains the driving motor, a suitable switch and controlling mechanism, and a foot or pedestal 8 which supports the driving or motor base mechanism 2. A suitable control handle 9 borne by the coin evaluating mechanism 5 controls the passage of the coins through the inspection and receiving hopper 4 to the coin feeding and evaluating mechanism, and also controls the starting of the switch in the motor base 2 as will be described later. The coin evaluating and registering mechanism is of the general type disclosed in my copending application, Serial No. 808,381, filed December 23rd 1913. In the subsequent description I shall describe briefly these parts of the mechanism, and shall proceed to describe thereafter, and with greater particularity the coördinated elements and groups of elements which enter into novel combination herein.

*Overhead register.*

The overhead register 3 is provided with an outer casing 10 which is apertured and provided with a transparent portion, as shown in Fig. 1. This overhead register 3 is provided with a trip register 11, having suitable resetting means including a resetting knob 12 and an in and out mechanism 13. The overhead register also includes a totalizing register 14 which may be viewed through a suitable sight opening in the front of the casing. The top of the casing 10 incloses a suitable gong which is struck by suitable mechanism each time that a five cent fare is registered. Inasmuch as the overhead register mechanism is fully described and illustrated in said prior application, I shall not describe the same in detail, but shall point out only the features wherein this overhead register coöperates with the rest of the mechanism. Suffice it to say that both the trip and the totalizing registers are operated by motion transmitted from the coin evaluating mechanism through a chain of elements including the gear 15 which lies immediately above the base plate 16 of the overhead register mechanism. The gear 15 meshes with a pinion 17 which is secured upon a short vertical shaft 18 bearing a cam 19 for operating the gong striker, and bearing also at its upper end a skew gear 20 (shown in dotted lines) which meshes with the skew gear 21. A spur gear 22 is connected to the skew gear 21 and to the first or unit register wheel of the totalizing register. The unit wheel is also connected to a suitable carry-over pinion mounted on the shaft 23. These carry-over pinions serve at suitable intervals to carry over multiples from the unit wheels to the tens wheel and so on. One of these carry-over pinions is shown at 24 in Fig. 14. The spur gear 22 is connected through suitable idlers, one of which is shown at 25 through the spur gear 26 which is mounted on the main shaft of the trip register 11. The trip register wheels 27 are advanced through suitable carry-over pinions 28 mounted on the ends of suitable arms 29. During resetting, the arms 29 bearing the carry-over pinions 28 are moved to disengage the numeral wheels 27, as is fully described in my above referred to application. A skew gear 31 is mounted upon the resetting shaft, which resetting shaft carries upon its outer end the resetting knob 12, and this skew gear operates the in and out mechanism 13, as is fully set out in the prior application above referred to. A shield or blind 32 is arranged to come down over the sight opening of the trip register during resetting. A pair of arms 33, only one of which is shown in Fig. 14, are pivoted at 34 to the side plate 35, and bear at their upper ends short pins or studs 36 which are disposed in a groove 37 on the resetting knob 12.

When the resetting knob 12 is pulled out to reset the trip register, the lower ends of the levers 33 are swung inward against the pressure of the spring 38, which spring tends to hold the levers 33 in the normal full line position as shown in Fig. 14. The levers 33 are connected together at the extreme lower end as by the pin 39. One end of a bell crank lever 40 lies in the path of the pin 39 so that as the knob 12 is pulled out the bell crank lever 40 which is pivoted at 42, must be swung about its pivot moving the other end of the bell crank lever 40 downward. The end 43 of the bell crank 40 rests upon the top of the interlocking rod 44, shown in dotted lines in Fig. 14, which rod passes down through the column 6 and coöperates with other mechanisms to be described later.

I shall next describe the coin receiving and inspection mechanism, and the coin evaluating mechanism, which receives the coins from the receiving and inspection hopper and causes registration of them upon the overhead register.

*Coin receiving and inspection hopper.*

The coin receiving and inspection hopper 4 is mounted upon the upper section 45 of the casing which incloses the coin evaluating mechanism 5.

This coin receiving and inspection hopper is described in detail in my copending application, Serial No. 69,484, filed in the United States Patent Office on December 30, 1915, to which reference may be made for a full description of the same. I shall therefore not describe the same in detail, suffice it to say that this hopper includes the open hopper top 46 and the hopper bottom 47 which are spaced apart and held in the proper relation by posts or pillars 48. These pillars 48 have notches at the top and bottom and rubber rings 49 are laid in the notches to form yielding pads for the sides 50 which form the lateral walls on all four sides of this chamber. The hopper top 46 is provided with a depending cup shape portion 52 which is provided with suitable perforations for the passage of coins therethrough, and is also provided with a suitable deflecting member as described in the aforesaid application.

A zigzag glass chute 53 has its upper end secured by a metal band 54 to the depending portion 52 of the hopper top. The glass chute 53 comprises two symmetrical halves which are bound together at their lower ends by a strap 56 and at their upper ends by the band 54. The band 54 is perforated at intervals to render it more flexible to conform to the circular contours of the depending portion 52 and the bead 74 on the upper edge of the glass chute. A plurality of spacing fingers 54' are struck up from the band 54 intermediate of these perforations and embrace the bead 74 to support the glass chute. A wire 75 encircling the chute below the bead and threading through the perforations in the band supplements the fingers 54' in this function. The lower end of the zigzag chute 53 is normally closed by a spring trap door 55 which is pivoted upon lugs formed on the strap 56 that embraces the bottom of the chute. The trap door 55 is very light and will not interfere with the passage of coins down through the chute, but being held closed by a slight spring tension, will prevent any coins from being shaken out through the zigzag passage in case the entire mechanism should be turned upside down.

A detecting comb 57 is secured near the top of the inspection chamber. This detecting comb is provided with a plurality of light spring fingers 57' which normally press against the glass sides 50. In case the hopper should be turned upside down, the coins contained in the hopper would slide between the spring fingers and the glass sides 50 and would be detained at that point, showing that there had been tampering with the mechanism.

The hopper bottom 47 is provided with pairs of lugs 58 and 59 upon each side thereof. The hopper bottom 47 is apertured so that coins may pass therethrough unrestrictedly and a pair of hinged trap doors 60 and 61 are hinged upon the pairs of lugs 58 and 59 respectively, and are connected by a link 62. The trap door 61 is provided with a depending arm 63 which bears a roller 64 lying in the path of an operating finger 65. This operating finger 65 is connected with the controlling handle 9 in a manner to be described later. The connection, it might be stated, is such that when the handle 9 is depressed, the trap doors 60 and 61 will be opened against the tension of the spring 66, shown in dotted lines in Fig. 6, which normally tends to hold the trap doors in a closed position. The pivots of the trap doors and the distance between the various centers are so arranged that the spring 66 normally holds the trap doors 60 and 61 firmly against the flange 67 around the opening through the hopper bottom 47. The outer and downwardly extending flange 68 of the hopper bottom 47 embraces the open flaring top section 69 of the coin chute. The flaring section 69 has a reduced portion 70 which telescopes into the top of the coin chute 72. The hopper top 46 is secured to the casing section 45 by means of the corner strips 73 (see Figs. 1 and 2) which are riveted at their lower ends to the lugs 74 upon the casing section 45, and project upward under the depending rim of the hopper top 46. These corner strips 73 thus serve as supporting columns for the assembled receiving hopper shown in Fig. 6 and also cover the edges of the glass sides 50.

The assembled hopper is secured in the casing 45 by suitable bolting means illustrated in Fig. 6^A. On two opposite sides of the flange 68 are riveted depending bolts 71 which are adapted to be received by the lugs 45' projecting inwardly from the casing 45, and secured thereto by nuts 71'. By this arrangement, unauthorized removal of the hopper is effectively prevented as this would require the separation of the upper casing 45 from the lower casing inclosing the coin evaluating mechanism, which necessitates the breaking of a seal, provided for detecting such acts. The manner of sealing these two casing sections together by this frangible seal will be hereinafter described in connection with my description of the supporting column for the overhead register.

Coin evaluating mechanism.

The coin evaluating mechanism which receives the coins from the receiving and inspection hopper, registers them upon the overhead register and discharges the coins to the conductor's coin box, is of the type and general construction first shown in my copending application, Serial No. 808,381, filed December 23rd, 1913, and is described herein only in general terms, except in so far as new features of construction are embodied. This mechanism is built into a frame having the base plate 76 from which four posts 77, 78, 79 and 80 extend upward and support two other plates 81 and 82 at their upper ends. The plate 81 is supported on these posts by small collars 83 which are pinned or otherwise secured to the post. The coin pan and sorter with the connecting driving means are located between the base plate 76 and the plate 81. The plates 81 and 82 are spaced apart by collars 84 upon the post and the upper plate 82 is secured against the top of these collars by suitable machine screw 85 or other fastening means.

A number of supplemental frame plates, bearing different parts of the mechanism, are located between the base plate 76 and the plate 81. One of the these supplemental plates 86 is secured immediately below the frame plate 81 to the post 80 and has a portion disposed diagonally as shown in Figs. 8, 9, and 10, which supports the cover 87 for the coin pan 88. Another supplemental plate 89 which is secured upon the post 77 between the collar 83 and a supplemental collar 90 has a portion disposed diagonally parallel to the diagonal portion of the plate 86 and this diagonal portion of the plate 89 forms a supporting frame upon which the bottom of the coin pan 88 rests. The plates 86 and 89 are spaced apart by bolts 91. An extension plate 92 is secured to the diagonal portion 89 and to the post 80. (See Fig. 8.) Another diagonal plate 93 is secured to the base plate 76 at its lower end and to the plate 92 at its upper end by means of the bolt 94. The plates 89 and 93 are spaced apart by suitable bolts 95. The plate 93 is apertured to receive the barrel 96 (see Fig. 10) which at its upper end bears a suitable ring 97 which forms a race for ball bearings, and bears at its lower end a similar ring 98 for the lower bearings of the coin pan shaft 99. The rings or races 97 and 98 are threaded into the barrel 96 and may be suitably adjusted for the height of the coin pan above the plate 89 and for the ball bearings. The coin pan shaft has an enlarged head or disk 100 to which the coin pan 88 is secured on one side and the gear 101 which drives the coin pan is secured on the other side. A hardened sleeve 102 on the outside of the shaft 99 forms coöperative bearing surfaces or cones for the ball bearings. The lower end of the bearing sleeve 96 is held by a supporting flange 103, which is secured to the plate 93. The coin pan shaft 99 has secured to its lower end a skew pinion 104. This skew pinion 104 coöperates with the interlock controlling mechanism to be described later.

The coin pan 88 has openings, such as 105, shown in dotted lines in Fig. 17, out through the bottom thereof. Coins entering through the chute 72 into the pan 88 drop into the openings 105 and are carried upward under the wiper plate 106 which is pressed by means of the spring 107 in the housing 108 into the engagement with the bottom of the coin pan.

The driving connection for the coin pan and other parts of the evaluating mechanism is as follows: The separable motor base 7 contains a motor 110, the main driving shaft of which carries a skew gear 111, which meshes with a coöperating skew gear 112 mounted upon the vertical shaft 113. This shaft 113 has a lower bearing 114 mounted on the base plate 115. At its upper end the shaft 113 is provided with an enlarged cylindrical portion 115′ which has a bearing in the top plate 116 and which is provided with the squared projection 117, shown in dotted line in Fig. 30. The squared projection 117 fits into a socket 118 which is screwed to the one-half of the spring clutch member 119. The clutch member 119 fits loosely upon the shaft 120, but is prevented from outward endwise movement by means of a washer 121 and a pin 122. A coöperating clutch sleeve 123 fits loosely upon the shaft 120 upon which it may be moved axially but with which it is compelled to rotate because of the pin 124 in the shaft 120 which lies in the diametrical slot 125 in the member 123. The coöperating spring clutch members 123 and 119 have similar projecting portions 126 and 127 engaging each other along a sloping shoulder. The upper end of the shaft 120 is provided with a bearing 128 secured to the plate 89. A collar 129 is pinned to the shaft 120 and a spring 130 is compressed between the collar 129 and the clutch member 123. The shaft 120 is embraced by a felt oil-retaining washer 131 which fits into a counter-bore in the bottom of the bearing 128. To the upper end of the shaft 120, is securely fastened the pinion 133, so that the two rotate together. The pinion 133 meshes with an idler 134 which in turn through an idler 135 connects with the spur gear 136 which is rigidly secured on the vertical shaft 137. The gear 136 is formed integral with or otherwise connected to the skew gear 138 (see Figs. 10 and 13), this skew gear 138 meshing with a coöperating gear 139 which is connected by means of a collar 140 with the coin gaging cam 141. The gear 139 and the cam 141 are keyed upon the shaft 142 which is provided at its upper end with the rotary bearing member 143 coöperating with the ball bearing 144. The shaft 142 has secured thereto the mutilated gear wheel 145 which is provided with a chute opening 146 between two adjacent spokes which chute opening leads into a diagonal chute ending axially of the shaft 142 to form a coöperating bearing at 147. The bearing 147 is formed in a stationary ring 148 which is mounted in the bottom of a coin receiving cup 149 mounted upon the auxiliary frame plate 93, which is apertured, as shown, to permit free passage of coins from the coin gaging cam to the coin chute 150 which forms a continuation of the cup 149 and registers with an opening in the side thereof. The chute 146 discharges into a special receptacle 151 which is closed by a special locked door 152 upon the outer casing, as will be described later.

The mutilated gear wheel 145 has a wide rim 153 within which lies a circular plate 154 which is supported by the auxiliary frame plate 92 as shown in Fig. 21. The upper part of the circular plate 154 has a sector cut therefrom and through this opening 155 coins are discharged from the gaging or measuring chamber which lies within the circular rim 153. Between the rim 153 and the coin gaging cam 141, there is defined a coin gaging or measuring passage. It will be noted that the coin gaging cam 141 is provided with gage points for nickels, pennies and dimes, respectively. As a coin is dropped into this gaging or measuring chamber from the pocket 105 in the coin pan 88, it is given opportunity to pass as far down the coin gaging passage as the diameter of the coin permits. This is because the rim 153 and the cam 141 rotate together in unison, and the spring pressed wiper tends to push the coin along the passage as far as its diameter will permit. The coins are caught by the respective gage points and are then moved along the table or plate 154 toward the opening 155. A spring pressed wiper 159 and the table or plate 154 have coöperating registering openings 160 and 161 through which the coin finding finger 162 is projected each time that one of the gage points 156 or 158 come into position so that any coin that they might be engaging would obstruct the passage of the finger 162 down through the openings 160 and 161. The wiper plate 159 has an upturned leading edge and a downturned trailing edge 163 which aids in projecting the coin through the opening 155 and out of the coin gaging chamber. The wiper plate 159 is held against the bottom plate 154 by means of the spring pressed pins 164 and 165. The space between the bottom plate 154 and the spokes 166 and 167 which lie on each side of the chute 146 is filled in or closed by the strip 168, which lies immediately above the spokes 166 and 167, and partially encircles the hub 169 of the gear wheel 145. The mutilated gear wheel 145 is provided with a solid portion 170 which solid portion operates with the mutilated portion of the gear 171. The gear 171 has an arm 172 projecting therefrom immediately above the base of the gear 171, and this arm is adapted to be engaged by the solid portion 173 upon the mutilated gear 145 after the blank portion 170 has passed. When the mutilated gear wheel 145 is turned in a backward direction, the pin 174 strikes the arm 172 and compels meshing of the gear teeth.

A pinion 175 mounted on the same shaft as the gear 171 meshes with an idler 176 which in turn transmits motion to the gear 101 which is secured to the coin pan 88. The mutilated gears are provided so that the coin pan 88 will be allowed to come to rest for a brief period at the time when a pocket 105 is above the coin gaging barrel. This delay occurs as each pocket 105 comes above the coin gaging barrel. The driving ratio of the mutilated gear wheel 145 to the wheel 171 is, including the lost motion, a 1 to 1 ratio and the gear ratio of the gear 175 to the gear 101 is a 1 to 3 ratio. It can thus be seen that as each pocket 105 comes up into the position shown in Fig. 17, there will be a momentary delay to allow the coins to drop out of the pocket into the coin gaging chamber.

I shall now describe the differential cam and the coöperating mechanism which operate the finding finger 162 to detect the presence of coins opposite the gage point on the coin gaging cam and to control transmission of their value to the overhead register. The differential cam 178 (see particularly Figs. 10, 22 and 23) and the holding cam 179 are secured to a flange 180 formed on the shaft 137. It will be recalled from the previous description that the shaft 137 is driven directly from the driving motor 110 by means of the spur gear 136 which is upon this shaft. The cam 178 causes the finding finger 162 to move down into the coin gaging passage at the points where nickels and dimes would be held if any were in the passage, and the resulting movement of the coin finding finger controls a differential clutch, which differential clutch controls the transmission of motion to the overhead register, all as will be described below. The coin finding finger 162 comprises the lower part of a bell crank lever 181 pivoted upon a lug 182 formed from the side of the plate 86. The upper arm of the lever is connected by a universal join 183, (shown in Figs. 22 and 23 in plan) to the end of the differential lever 184, the other end of which lever is pivoted by the pin 185 to the clutch lever 186. The differential lever 184 is provided intermediate its ends with a pair of rollers 187 and 188, which embrace the flange of the cam 178.

The upturned rim of the cam 178 contains two indented portions,—189, and 190, for nickels and dimes respectively. That is to say, since the differential cam 178 is directly geared and rotates in unison with the coin gaging cam, it will be seen that the finding finger 162 will be brought down to test for the presence of nickels and dimes at the time when the gage points 156 and 158 respectively present their carrying surfaces to the aperture 160, which is immediately below the finding finger 162.

The clutch lever 186 is a bell crank lever pivoted at 191 and provided with arms 192 and 193 which form pawls or detents for engaging the escapement wheels 194 and 195 respectively. The lever 186 is normally held in the position shown in Fig. 22 by means of the spring 196, with the arm 192 engaging the escapement wheel 194 to hold the same stationary.

It will be seen from Fig. 10 that the shaft 137 is keyed or splayed at the upper end, as shown at 197, and the short sleeve 198 is thus secured thereto, this sleeve 198 having in turn the knock-off cam plate 199 keyed thereto. The escapement of wheel 195 is loosely mounted on the shaft 137 between the knock-off cam plate 199 and a shoulder 200 on the shaft 137. The upper escapement wheel 194 is loosely mounted on the sleeve 198 and has an extending hub or sleeve 201 formed integral therewith. The upper end of the sleeve 201 extends above the shaft 137 and the sleeve 198 and is slotted, as shown at 202, (see Figs. 10 and 15) to receive the extending arms 203 of a sleeve 204, which is pinned to the register operating sleeve 205 that extends up through the column 6.

The escapement wheels 194 and 195 are provided with spur teeth 206, 207, respectively, and these spur teeth mesh with a pair of pinions 208, and 209, respectively, which pinions are journaled upon suitable bearings upon the knock-off cam plate 199, and which pinions mesh with each other. From the above it can be seen that if the shaft 137 is rotated, the knock-off cam plate which carries the pinions 208 and 209 will also be rotated, and if one of the escapement wheels 194 or 195 be held stationary, the other will revolve forward at twice the speed of the shaft 137. In the normal position, shown in Fig. 22, when the pawl 192 engages the upper ratchet 194 to hold the register operating shaft stationary, the lower ratchet wheel 195 is revolved idly.

The clutch lever 186 is secured to a sleeve 211 which surrounds the shaft 191 upon which this lever is pivoted. A holding arm 212 is secured to the sleeve 211 and thus operates in unison with the arms 192 and 193. The outer end of the arm 212 bears a projection or pin 213 shown in dotted lines in Fig. 23. This pin 213 normally lies inside of the flange of the holding cam 179, but when the finger 162 is prevented from moving downward by the presence of a coin, the inner end of the differential lever 184 swings the detent arm 192 out of engagement with the ratchet wheel 194 and swings the arm 193 into engagement with the ratchet wheel 195, the pin 213 being swung upon the outside of the flange of the holding cam 179. The flange of the holding cam comprises two portions, 214 and 215, for the nickel and dime transmission respectively. It is to be noted that the coin cam 178 contains cam portions 189 and 190 for nickels and dimes only. This machine is not designed to make any registration of pennies. The detent arm or pawl 193 is provided with a dog 216 which is pivoted upon the pin 185 and held in position by a spring 217 to prevent rebound of the ratchet wheel 195, which might occur during rapid operation of the machine. A small anti-friction roller 218 is mounted on the pin 185 and is adapted to be engaged by the knock-off cam 199 just after the pin 213 drops off the outside of the flange 214 or 215 after completing the transmission of movement for registering a nickel or a dime, respectively. The knock-off cam plate 199 is provided with knock-off portions 219 and 220 which are so related to the throws of the cam 178 that the lever 186 will be driven outward to release the ratchet wheel 195 from the pawl 193 and to cast the pawl 192 into the teeth of the ratchet 194 just after a transmission to the overhead register is completed.

The pin 221, which connects the spring 196 with the clutch lever 186, projects downwardly and has pivoted to its lower end the twisted link 222 shown in Figs. 9, 24 and 26. The collar 223 holds the link 222 in proper relation to other elements later to be described. The function of the lever 222 is to transmit motion by way of the levers 224 and 225 to the seven turn delay controlled interlock controlling mechanism which coöperates with the skew gear 104 on the coin pen shaft 99, as will be described later, to control resetting of the trip register. In addition, the link 222 controls by its movement the delay controlled normaling element that governs opening of the motor. In other words, the function of this link is, as will be described in detail later, to prevent the motor from being stopped until the last coin has been registered and seven turns of the coin pan made thereafter to insure that the coin pan is empty, before the overhead trip register can be reset.

I shall now describe the column connecting the coin evaluating mechanism and the overhead register.

Column.

The column 6 which connects the overhead register with the coin evaluating mechanism, serves both as a mechanical support for the overhead register and as a connecting link between the coin evaluating mechanism and the overhead register. A spider or bracket 227 has four arms which are connected to the corner posts 77, 78, 79 and 80, respectively. This bracket has a central boss 228 with an opening therethrough directly in line with the shaft 137. The boss is threaded on the outside to receive the threaded collar 229 which screws down upon the top of the casing section 45 (see Figs. 1, 2, and 3). The main shaft of the column comprises an outer tube or sleeve 230 which passes through the aperture in the boss 228 and through the collar 229. This outer sleeve 230 has a collar or ring 231 secured thereto by a set screw 232. The ring or collar 231 rests upon the top of the boss 228 and bears the weight of the column and the overhead register. The bottom plate 16 of the overhead register is apertured and provided with a bushing 233 which forms a bearing for the stub shaft 234 which has the register driving gear 15 secured to its upper end. A flanged collar 235 is secured as by the rivets 236 to the base plate 16 of the overhead register. The top of the outer sleeve or shell 230 rests against the flange of the collar 235 and the collar is threaded exteriorly to receive the threaded end of the sleeve 237. The bottom end of the sleeve 237 is threaded internally to receive the plug 238 which has a flange extending over the end of the outer sleeve 230. The set screw 232 which screws into the outer sleeve 230 is provided with a sharp point which is driven into the metal of the inner sleeve 237 to hold the parts securely together. The stub shaft 234 is provided at its lower end with a coupling 239 which coöperates with a diametrical slot 240 in the end of the hollow driving shaft 205. The driving shaft 205 passes through the sleeve 237 (see Fig. 15) to the sleeve 201 and is rotated by the differential clutch mechanism through the sleeve 201 whenever a coin is to be registered. The top of the outer sleeve 230 is provided with a flanged collar 241 which is pinned thereto. The flange of the collar 241 serves to support the bottom and sides of the casing of the overhead register.

The bottom of the threaded sleeve 229 is provided with a ratchet portion 243 which coöperates with a pawl 244 pivoted upon the bracket 227 and having a tail 245 extending downward and ending in front of an aperture 246 which is closed by the glass seal 247. The spring 248 normally casts the pawl into the teeth of the ratchet so that when the collar 229 is screwed down over the casing 45, the same will be held against unscrewing. To release the collar 229, it will be necessary to break the glass seal 247 to release the pawl 244.

The nature of the clutch formed between the driving shaft 205 and the end of the stub shaft 234 permits of sufficient endwise play to make up for slight differences in length due to manufacture. The interlocking rod 44 passes down through the driving shaft 137 (see Fig. 10) and rests upon the end 250 of the interlocking lever 251, shown in plan view in dotted lines in Fig. 24.

The base plate 76 of the coin evaluating mechanism 5 is provided with a number of legs or feet 252 which have reduced pins or extensions 252' that project through suitably placed holes in the top plate 116 of the motor base mechanism.

I shall now describe the motor base and the switch mechanism contained therein.

Motor base.

The motor base 2 is provided with a top casing section 254 and a bottom casing section 255, the top plate 116, and the bottom plate 115. The top plate 116 has a portion 258 bent downward and secured at 259 to the base plate 115. This side plate 258 forms the upright portion of the frame connecting the top and bottom plate. A pair of supplemental frame plates 261 and 261' lying on each side of the motor 110 together with the frame plate 259 form a frame shaped like an open box for receiving the motor and the switch controlling mechanism.

The base plate 115 has a hollow stub shaft 262 riveted thereto and this stub shaft fits into the bearing formed in the boss 263 of the foot or base casting 8. The hollow shaft 262 is slotted about half way in order to allow the base plate 115 and the mechanism carried thereby to turn through 180° but to prevent complete rotation. Complete rotation would eventually result in twisting off the leads to the motor. A bolt or screw 264 projects in the slot 265 which is considerably wider than the bolt so as to allow of lost motion between these parts but to prevent the base plate and the motor base from being removed from the foot 8. The boss 263 of the foot casting 8 bears a pair of small rollers 266 which normally rest in a diametrical groove 267. The diametrical notch 267 is so spaced that when the motor base is turned into one extreme position, the rollers 266 will drop into this notch, and when the motor base is turned in the other extreme position, the rollers will again rest in a notch. This tends to hold the motor base and the supported mechanism yieldingly in position. The wires for the circuit of the motor 110 are led up into the motor base through the hollow shaft 262.

As the driving connection of the motor to the coin evaluating mechanism has been set out above, I shall describe the switch and controlling mechanism for controlling the circuit of the motor.

*Motor switch and controlling mechanism therefor.*

As it is desirable that the motor be started whenever coins are discharged into the coin pan 88, so that the coins may be promptly counted, I have arranged mechanism connected with the handle 9 to trip the trap doors and to operate the switch to start the motor.

The handle or operating crank 9 is connected by a square off-set coupling 269 to the control shaft 270. The control shaft 270 bears a cam 271 (see Figs. 24 and 25) which engages a roller 272 mounted on the depending arm 273 of the trap door operating lever 65 shown in Fig. 6. The trap door operating lever 65 is connected with a spring 274 which holds the roller 272 against the cam 271. Upon the same controlling shaft 270 is mounted the switch controlling cam 275 (see Figs. 24 and 26). The cam 275 engages a roller 276 which is mounted on the lever 224. The lever 224 is pivoted at its upper end at 278 upon a lug 279 mounted on top of the frame plate 81. A pin 280 is mounted on the lever 224 and this pin projects into a slot in the end of the arm 222 which is connected to the differential clutch mechanism. This lost-motion connection serves to operate the lever 224 whenever a transmitting movement is made to the overhead register in registering a coin. The lower end of the lever 224 bears a pin 281 which connects the lever 224 with the bell crank lever 225, (see Fig. 9).

The shaft 270 has bearings in a pair of lugs 282 and 283 which are secured to the bottom of the frame plate 81. At its outer end, the shaft is provided with a bearing having an extending flange 284 which covers the edges of the opening in the casing and gives the same a finished appearance.

The shaft 270 bears in addition a third cam 285 which controls the operation of the resetting mechanism of the trip register. It will be recalled that in order to reset the trip register, it is necessary to pull out the resetting knob 12. In order to pull out this knob, it is necessary to move the interlocking rod 44 downward through the center of the column. The lower end of the interlocking rod 44 engages the end of the lever 251 which is pivoted upon a pin 286 suspended in the end of the yoke 287.

The rear end 288 of the lever 251 is normally held in a down position by means of the spring 289. This end of the lever carries an arm 290 which projects under the cam 285. Another arm 291 bears a pin 292 which projects into the slotted end of the bell crank lever 293. The lever 293 is pivoted on a bracket 294 secured to the bottom of the diagonal frame plate 93. The bell crank lever 293 has its lower end 295 extending downward in position to engage the interlock controlling mechanism hereinafter described.

Hence, it can be seen that the arm 291 on the interlock controlling lever 251 is controlled by the presence of coins in the evaluating mechanism, and the arm 290 is controlled by the condition of the trap doors. As shown in Fig. 26 the cam 285 consists of a circular collar having a notch 296 cut into the periphery thereof, this notch being adapted to receive the end of the arm 290 when the trip register is reset.

The trip register cannot be reset unless all of the coins have been registered and the pan given seven additional turns to insure that any coin which might be in the pan would have been carried into the evaluating mechanism. This is accomplished through the arm 291 and bell crank lever 293 by the following mechanism. The seven tooth skew pinion 104 engages a coöperating mutilated spur gear 297 which is pivoted on a pin 298 mounted on the upper end of a short bell crank lever 299 which is pivoted at 300 on a bracket 301 mounted upon the base frame plate of the coin evaluating mechanism. A short obstructing arm 302 is mounted upon a collar 303, which collar is journaled upon the pin 298 on the back side of the mutilated gear 297 as viewed in Fig. 12. A spring 304 connects the obstructing arm 302 with a pin 305 and the spring 304 normally holds the obstructing arm against this pin 305 in such position that the end of the arm lies over and obstructs a notch 306 formed in the periphery of the mutilated gear. The outer end of the arm 307 of the bell crank lever 299 is connected by means of a stud 308 with the end of the bell crank lever 225. A short controlling stud 309 is also connected to the pin 308, and this stud connects the controlling handle 9 with the switch controlling mechanism in the motor base 7. A coil spring 310 connects the end of the arm 225 with the mutilated gear 297 by means of a pin 311. The tendency of the spring 310 is to turn the mutilated gear 297 about the pin 298 in a clockwise direction, as viewed in Fig. 12, to bring the pin 311 against the lever 299 as shown in dotted lines at 312 in Fig. 12.

This is prevented by the skew pinion 104, the teeth of which engage the teeth of the mutilated gear 297.

If, however, the arm 225 should be moved downward by movement of the bell crank lever caused either by the registration of a coin or by movement of the controlling handle 9, the teeth of the mutilated gear 297 would disengage the pinion 104 and the mutilated gear would swing about its axis and would bring the solid portion of the gear in front of the end 295 of the bell crank lever 293. This would prevent pulling out of the resetting knob as the bell crank lever 293 must be swung about its pivot in order to accomplish the preliminary movement of resetting. The arm 295 would engage the solid portion of the mutilated gear and thus resetting would be impossible immediately after the registration of a coin, or after the handle 9 had been operated to open the trap doors. In either case, the movement of the bell crank 225 depresses the stud 309 to start the motor, as will be described later, and as the coin pan is rotated, the skew pinion 104 begins to move the mutilated gear back into the position shown in Fig. 12. If, at this time, a coin be registered, the bell crank lever 225 will again be moved to disengage the mutilated gear and the pinion, and the pinion again starts to wind up the spring 310 to bring the mutilated gear back to the position shown in Fig. 12. But during the time that the winding of the spring 310 occurs, it is impossible to reset the register, due to the fact that the solid portion of the mutilated gear 297 lies in the path of the end of the arm 295.

If it is desired to reset the trip register, the controlling handle 9 is moved to the downward position to open the trap doors and to start the motor. The controlling handle remains down and the doors 60, 61 remain open, since the pin 272 rests against the circumferential dwell A of the cam 271. This circumferential portion or dwell A blocks the springs 66 and 274 which normally hold the doors 60, 61 in closed position and handle in raised position. When the handle is down the switch tripping cam 275 lies below the pin 276, hence the switch may be opened after seven idle turns as will be described later. Any coins that are deposited during resetting drop through the open trap doors into the coin pan 87, 88. They will be rung up as soon as the handle is moved to the upper position as the cam 275 again engages the pin 276 on the upward movement.

After the motor is started the resetting knob 12 is pulled out so that the end 295 of the bell crank lever 293 engages the blank portion of the mutilated gear 297 since the gear was tripped out of engagement with the skew pinion 104 by downward movement of the lower arm of the bell crank lever 225. The resetting knob is held out so that the end of the arm 295 will lie in the path of the obstructing arm 302 as the same is rotated toward the position shown in Fig. 12. Due to the spring engagement between the obstructing arm 302 and the mutilated gear 297, the gear will be moved on but the obstructing arm 302 will be brushed aside by the end of the arm so that when the notch 306 comes opposite the end of the arm 295 the resetting knob 12 may be pulled to the extreme outward position where it is possible to reset the trip register. At the same time, the mutilated gear 297 will have reached the end of the teeth and the last tooth will rest upon the skew pinion 104 until the controlling handle is moved again. At the same time that the mutilated gear 297 reaches the position shown in Fig. 12 to allow the resetting knob to be pulled out, the motor switch will be opened to stop the running of the mechanism, and resetting of the overhead trip register can be finished.

The motor switch mechanism, and the control mechanism is contained in the motor base 7.

*Motor switch.*

The motor switch comprises a pair of spring fingers 315 and 316, which are secured to a block of insulation 317 which spring fingers form the stationary element of the switch. The movable element consists of a copper connecting bolt 318 mounted upon a circular disk of insulation 319 which circular disk in turn is mounted upon a shaft 320 (see Fig. 34). The shaft 320 is covered by an insulating sleeve 321 in order to cover this part of the shaft which is adjacent to the spring terminals 315 and 316. The disk 319 is rotatable with the shaft 320 and by means of the escapement mechanism, which will be described later, this switch is capable of assuming two positions, one shown in Fig. 28 in full lines, when the head of the metal plug 318 which passes through the disk of insulation 319, makes contact between the springs 315 and 316, and the other position is that shown in dotted lines in Fig. 28, when the metal plug 318 is angularly displaced 180° as shown in dotted lines. The circuit wires for the motor 110 are shown at 322 and at 323 as being connected to the springs 315 and 316 by means of suitable binding posts with which these springs are provided. The rotatable disk 319 has a groove 324 upon its periphery and a thin strip of insulating material 325 fits into the groove 324 and closely around the circumference of the groove in order to form a barrier for any arc that might tend to form between the spring contacts. The portion of the frame adjacent the switch is lined with a sheet of insulating material 326 and a similar sheet 327 forms a curtain between the switch and the adjacent metal parts.

The escapement mechanism for causing the switch to assume alternately the open position and the closed position operates through the medium of a spring 328 connected with the switch shaft 320.

The switch shaft 320 has bearings in the short bearing sleeves 329 and 330 mounted in the switch frame plate 331 and 332 respectively (see Figs. 28 and 34). These side plates are triangular in outline, having the lugs 333 at one corner of the base, the connecting bolt 334 at another corner of the base, and the connecting bolt 335 at the apex thereof.

The switch shaft 320 has an escapement wheel 336 which is pinned thereto, as shown at 327 in Fig. 34. One end of the spring 328 is secured to the escapement wheel 336 and thus to the shaft 320 and the other end of the spring is secured to the winding ratchet 338. The winding ratchet 338 and the escapement wheel 336 are spaced apart on the shaft 320 by means of a sleeve 339. The winding ratchet 338 is wound by the rotation of the motor 110 and mechanism is provided for insuring that the spring will always be wound to full tension before the switch will be operated. Mechanism is further provided to prevent over-winding of the spring 328. This last action might occur in case a large number of coins are to be registered, that is to say, a long period of operation of the motor 110. The vertical drive shaft 113 bears a worm 340 (see Figs. 30 and 31) which meshes with the gear wheel 341 which is formed upon the sleeve 342 rotatable upon the shaft 320 as shown in Fig. 34. The rewinding sleeve 342 has connected thereto, a ratchet 343 coöperating with the winding ratchet 338 to rewind the spring 328. The connection between the two parts 343 and 338 is a pawl 344 pivoted at 345 upon the winding ratchet 338. The spring 346 tends to cast the pawl 344 into the teeth of the ratchet 343. The pawl slipping cam 347 is mounted on the shaft 320 between the winding ratchet 338 and the driving ratchet 343 and connected to the shaft 320 by means of a pin 348 which plays in a slot 349 in the body of the cam.

In view of the fact that the switch rotates only 180° at each operation, that is, either to close circuit or to open circuit, but the winding mechanism must complete a full winding operation while the motor is running, that is, while the switch is in the closed position, the slot 349 and the pin 348 are necessary to allow the switch to complete each step of 180° without interfering with a complete operation of winding the spring through 360°. The pawl 344 is provided with a pin 350 which lies in the path of the projection 351 of the cam 347. The pawl 344 is also provided with an extension 352 which is adapted to strike the pin 353 to limit the outward movement of the pawl 344. The winding ratchet 338 is provided with a pair of pawls 354 and 355 (see Figs. 29 and 32) which are pressed by a spring 356 into engagement with the teeth of the ratchet 338. As the winding sleeve 342 rotates in a direction to wind the spring 328, the teeth of the driving ratchet 343 engage the pawl 344 and drive the winding ratchet 338 in a clockwise direction as viewed in Fig. 32. When the winding ratchet 338 has been moved through a complete winding movement of 360° the pin 350 rides upon the projection 351 of the cam 347 and is thereby disengaged from the tooth with which it previously had engagement and slips to the next tooth. That is to say (see Fig. 32) as the driving ratchet 343 moves in a clockwise direction, the pawl 344 will be moved to the point where further movement will disengage the pawl from the tooth of the driving ratchet and will allow it to jump to the next tooth. This action of securing a complete winding movement occurs shortly before the coin pan 88 has made a complete series of seven turns sufficient for the skew pinion 104 to move the mutilated gear 297 to the position shown in Fig. 12. The result of this synchronism is that the motor switch will shut off at the same time that the notch 306 arrives opposite the end 295 of the bell crank 293 which controls the pull out movement of the resetting knob 12.

Successive movements of the switch, that is from open to closed position or vice versa, are controlled by the handle 9 and by the rewinding mechanism alternately. The escapement disk 336 which is pinned to the switch shaft 320 is provided with two stop members 357 and 358 which are struck up from the side of the disk and project from opposite sides thereof.

The stop member 358 is held by a projecting finger 359 extending from the lower arm 360 of the bell crank lever 361 which is pivoted on the pin 362. The pin 362 is mounted on a lug bent up from the inner frame plate 332. The arm 361 is connected to a bent link 363 by means of the pin 364. The upper end of the bent link 363 extends under the top plate 116 and has a pin 365 which coöperates with the pin 309. It will be remembered that the pin 309 which passes through the base plate 76 of the coin evaluating mechanism is connected to the controlling handle 9 so that the pressure of the controlling handle 9 forces the pin 309 downward. As the pin 309 engages the pin 365, movement of the pin 309 downward results in a disengagement of the finger 359 from the stop 358 and this allows the escapement disk 336 to move through half a revolution, being thus moved by unwinding of the spring 328. This half revolution moves the movable switching contact 318 into the position shown in Figs. 28, 29 and 32. The escapement disk is prevented from revolving further by engagement of the stop member 357 with the spring controlled detent 366. The detent 366 is mounted on the square shaft 357, which shaft is pivoted at its ends in the frame plates 331 and 332. At its outer end the square shaft is provided with a tripping finger 369 which has connected thereto the spring 370, and this spring tends normally to hold the detent 366 in the path of the stop member 357. After the switching spring 328 has been wound up, the detent 366 is disengaged from the stop 357 by engagement of a pin 372 with the tripping finger 369, as will now be described. Such disengagement of the detent 366 and the stop 357 allows the switch spring 328 to rotate the switching disk 319 through 180° to open the switch, the shaft being then stopped by engagement of the stop 358 with the finger 359.

The detent 366 is provided with a projecting tail 415, which prevents the escapement disk from escaping more than 360 degrees, which it might otherwise do under certain circumstances. The escapement disk 336 normally moves through only 180 degrees at a time, but if the release handle 9 be operated to withdraw the detent 359 from the stop member 358 at the instant that the seven turn stopping mechanism has completed its cycle and has just withdrawn the detent 366, both these detents 359 and 366 will be withdrawn at once, and if the tail 415 were not provided the spring would completely unwind.

As above described, when the controlling handle 9 is depressed the mutilated gear 297 (Fig. 12) is disengaged from the skew pinion 104 to obstruct resetting. Motion is transmitted down through the pins 309 and 365 which are the coöperating pins of the coin evaluating mechanism and the motor base mechanism respectively. This downward motion is transmitted to the bent link 363 which disengages the segment 378 from the restoring pinion 383 so as to set the catch 366 and then trips or releases the switch shaft which is then moved by the spring 328 to close the switch. The lower end of the link 363 is twisted sidewise as shown at 373, and is connected by a pin joint to the end of the crank arm 374. The crank arm 374 is mounted upon the square shaft 375 which has bearings in the side plates 331 and 332 and lies parallel with the shaft 367 which controls the detent for holding the switch in closed position. The shaft 375 carries an additional arm 376 (see Figs. 30 and 31) which carries on its outer end the pin 377, which forms the center or axis of a gear sector 378. The gear sector 378 is connected by the pin 372 to a spring rod 380, the other end of which spring rod passes through a lug 381 (see Fig. 30) connected to the frame plate 261. A spring 382 tends to thrust the pin 372 upward thus holding the gear sector upward in engagement with the restoring pinion 383. It can be seen from Fig. 34 that the restoring pinion 383 is mounted on the sleeve 342 and is moved in unison with the driving ratchet 343 which rewinds the spring 328 as the driving shaft 113 revolves and transmits motion to this sleeve through the worm 340 and the worm wheel 341. When rotational motion of the driving shaft 113 has occurred in amount sufficient to restore the mutilated gear 297, shown in Fig. 12, to its normal position, the gear sector 378 will have been moved around its axis 377 to an extent sufficient to bring a pin 372 which projects out over the end of the tripping finger 369 into engagement with this finger to turn the shaft 367 sufficiently to disengage the detent 366 which is mounted on the shaft from the stop member 357 and as the spring 328 is then free to move the escapement 336 and the shaft 320, the disk and shaft will be moved through 180°, that is to a position in which the switch is open and in which the stop member 358 is engaged by the finger 359 on the bell crank lever 361. This amount of motion is also sufficient to rewind the spring 328 through a complete revolution, that is, through 360° of movement. The motion of the restoring pinion 338, is in such a direction as always to oppose the spring 382, and if while the movable sector is being restored a coin is registered, the operation of the differential clutch mechanism will cause movement of the pin 365 downward. This movement being transmitted to the link 363 and thence to the crank 374, turns the shaft 375 in such a direction as to move the bearing 377 of the gear sector 378 downward, so that the teeth thereof disengage the teeth of the restoring pinion, and as a consequence the spring 382 will move the sector back to the zero or unwound position, as shown in Figs. 30 and 31. This sector serves as means for delaying the opening of the switch until a certain predetermined number of turns have been made after the registration of the last coin. The relation between the winding mechanism and the restoring gear sector 378 is such that in executing said predetermined number of revolutions the spring 328 will be wound through a complete turn and will just begin to slip to prevent over winding when the gear sector 378 is completely restored and trips the motor switch to stop the motor.

The short lever arm 374 which is connected to the square shaft 375 and to the twisted link 373 (see Fig. 32) is provided with a nose or cam surface 417, which is adapted to be engaged by the bearing sleeve 418 (see Fig. 28) which is mounted on the winding ratchet 338. In case the handle 9 be pressed down and immediately released or raised the swinging sector may not have sufficient time to swing clear of the winding pinion 343 before it is forced back into mesh with the pinion and its return to zero or release position thus prevented. Such abnormally quick operation would, however, release the detent 359 and permit the switch to be closed by a movement of the disk 336 through 180 degrees.

If no coins were registered the running of the motor would bring the gear sector back to the wound position in less revolutions than are required to wind the spring through 360 degrees, and as a result the motor would be stopped by opening of the switch before the spring 328 was fully rewound. Thus by a number of false operations, the spring might become unwound and the machine put out of commission. To prevent such action the nose 417 on arm 374 is placed in such relation to the sleeve 418 on the winding ratchet 338 that if the arm 374 is restored immediately after tripping the handle 9 the winding pinion 338 by means of the sleeve 418 will engage the nose 417 of the arm 374 and force it down, thereby disengaging the swinging sector and compelling a complete rewinding of the spring and a full operation of the seven turn mechanism.

The path of the coins deposited by the passengers or patrons, after the same have been registered will now be set out.

*Conductor's coin door.*

The coin delivery chute 150 which receives the coins discharged from the measuring chamber after registration has its end terminating directly over a chute 385 contained in the motor base. The chute 385 is secured to the top frame section 254 by an angle bracket 386. The chute 385 is closed at the sides and bottom and the front thereof is closed by a swinging door 387 which has a lip 388 extending inwardly under the bottom edge of the chute 385 and a pair of wings 389 and 390 which form extensions of the side when the door 387 is swung open. The door 387 is pivoted at its upper end on a shaft 391 which extends across the front of the chute. A suitable guard plate 392 prevents any coins from being lodged between the shaft 391 and the top of the casing. The delivery spout 393 which serves also as an operating handle for opening the door 387 is provided with wing or side portions 394 for directing the coins into the hand when this spout is raised. The spout 393 is pivoted on a shaft 395 which is mounted just inside of the shell or casing portion 255. One of the side wing portions 394 is provided with an arm 396 which extends back into the casing. The arm 396 is pivoted to a link 397 which is connected at its upper end to the wing portion 389 of the door 387. The wing portion 390 is also provided with a stop 398 for preventing excessive movement of the wing portion 390 and the door 387. A spring 399 normally holds the arm 396 in raised position and thus closes the door 387. When the conductor desires to remove the coins from the chute, he places the fingers of one hand under the spout 393, the casing 255 being cut away and closed by a plate 400 to provide for such operation, and then pulls upward on the spout 393, thus transmitting movement to the door 387 and causing it to swing outwardly thus delivering the coins that may be contained in the chute 385 into the hands of the operator. When the operator or conductor releases his hold on the spout 393, the spring 399 closes the door 387 and restores the part to the position shown in Figs. 37 and 38.

The coins of odd monetary value which are discharged into the receptacle 151 may be removed therefrom through a door 152 shown in Figs. 21, 39 and 40. This door is hinged by a suitable hinge 401 to the casing surrounding the coin evaluating mechanism, and is held in closed position by a suitable lock 402 preferably of the cylinder type, having a bolt 403 projecting out of the lock. A swinging detent member 404 pivoted to the door at 405 has a lug 406 which extends back of the bolt 403 and is held by the spring 407 in such position that the bolt 403 cannot be withdrawn to open the door until the lug 406 is withdrawn from the rear of the lock. This detent is provided with a downwardly projecting finger or trigger 408 that projects down in front of a frangible seal or closure 409 set back of an opening in the body of the door. The finger 408 normally passes back of a guide member 410 on the back of the door to prevent bending of the finger 408 sidewise in case the closing member 409 be destroyed. The spring 407 holds the detent member 404 against a pin 411 which determines the position of the same.

The frangible seal is provided as a double security. In order to open this special compartment it is necessary first to break the seal 409 and then to operate the lock with a suitable key. If a key only were employed the same would quickly find its way into the hands of the various unauthorized employees. But an unauthorized employee having no frangible seal to replace the one broken would leave the evidence of his act by failure to replace the broken seal by another one. An authorized person may break the seal, operate the lock with the proper key and then replace the broken seal, with a proper one. The seal that I employ is a signature seal which cannot be duplicated except by the person whose signature is chosen. This may be constructed of a piece of glass having cemented thereto a piece of paper or the like having the authorized signature. The sealing member may be constructed in any equivalent manner, the function being to make the replacement impossible, except by a person in authority.

In order to unlock the door 152, it is necessary first that the signature seal 409 be broken. Then the detent member 404 must be moved so that the lug 406 no longer obstructs the bolt 403 after which, by means of the proper key, the bolt 403 may be withdrawn and the door opened. To insert a new seal or frangible member 409, it is necessary merely to raise the member 404 clear of the frame which receives the glass 409, and when the member 404 is replaced under the influence of the spring 407, the finger 408 holds the frangible member in position back of the opening. It will be apparent from the above that the proper coins, namely nickels and dimes will be registered and discharged through the delivery chute 385, but pennies or flattened dimes and the like will not be registered and will be segregated from the proper coins and deposited in a special receptacle.

I shall now describe the general operations of the machine in registering a coin.

*Operation.*

Assume that the coin register and motor base are located in one end of a street car and the passenger in paying for his passage, deposits a nickel in the hopper top 46 of the receiving and inspection chamber, which I term as a whole, the receiving hopper. The coin passes down through the zigzag chute 53 and passing the door 55 drops on top of the trap doors 60, 61 in plain sight of the conductor in charge of the machine. Stopping the coins on the trap doors 60, 61 gives the conductor an opportunity to inspect the coins to assure himself that the passenger has deposited the proper coin. It also acts as a deterrent on the part of the passenger to prevent an attempt on his part to pass a spurious or improper coin.

The conductor moves the controlling handle or crank 9 downward and it remains at the bottom of its stroke. This downward movement accomplishes a number of things. It disengages the interlock controlling mutilated gear 297 from the skew pinion 104 and permits it to escape so that resetting will be prevented. At about the same time the gear sector 378 disengages the restoring pinion 383. The motor is then started by tripping the detent 359—358 to cause a half revolution of the switch shaft 320. The trap doors 60 and 61 are operated so that the coins are directed to the coin pan. The motor is started before the doors are swung completely down.

Opening of the trap doors is caused by the cam 271 engaging the operating finger 65 to swing the trap doors downward. Starting of the motor is caused by the cam 275 on the controlling shaft 270 (see Figs. 24 and 26) striking the pin 276 and moving the swinging arm 224 outward. This moves the bell crank lever 225 about its pivot thrusting the pin 309 downward. Movement of the pin 309 downward causes movement of the pin 365 in the motor base and this pin, being connected to the bell crank lever 361, (see Fig. 29) disengages the finger 359 from the lug 358 (see Fig. 36) thereby allowing the spring to unwind for half a revolution and to move the switch into the closed circuit position as shown in Fig. 29. At this stage, the detent 366 catches the lug 357 and holds the switch in closed position. This is because the twisted link 363 is connected at its lower end to the shaft which withdraws the gear sector 378 from the restoring pinion 383, thereby allowing the gear sector to spring back to zero position and the detent 366 to drop into the path of the lug 357 and hold the switch in the closed position until the gear sector 378 is restored and trips the detent 366 out of engagement. The coin evaluating mechanism registers the coin upon the overhead register, as will be readily understood, and when the clutch lever 186 is swung about its pivot, the pin 221 draws the twisted link 222 toward the left, as viewed in Figs. 9 and 26, and again swings the swinging arm 224 about its pivot to tilt the bell crank lever 225 and thrust the pin 309 downward. This downward movement of the pin 309 again transmits downward motion to the pin 365. Inasmuch as the finger 359 does not engage the lug 358, such movement does not affect the switch. However, movement of the link 363 downward turns the crank 374 and the shaft 375 to pull the gear sector 378 out of engagement with the restoring pinion 383 and the gear sector snaps back to zero position, and hence requires seven turns of the pan 88 before it is restored to normal and trips the detent 366 by engaging the finger 369 to stop the motor.

Each time that a coin is registered on the overhead register, this operation is repeated, namely, the link 222 swings the arm 224 and the bell crank 225 about their respective pivots to transmit motion to the link 363 and cause disengagement of the sector 378 with the restoring pinion 383 and thereby delaying opening of the switch for seven more turns of the coin pan. The seven turns are purely arbitrary and it is to be understood that any predetermined number may be employed.

Resetting of the trip register.

As above explained, to reset the trip register, an opening or preliminary movement of the resetting knob 12 outward axially is necessary before the register can be reset. This opening movement requires that the bell crank lever 40 pivoted in the lower left hand corner of the structure as shown in Fig. 14 be swung about its pivot in a direction to force the interlocking rod 44 downward through the column. Downward movement of this rod is normally prevented by the arm 290 of the lever 251 (see Figs. 24 and 26) which engages the surface of the cam 285 on the controlling shaft 270 to which the handle 9 is secured. It is therefore necessary that the handle 9 be pushed down so that the notch 296 in the cam face be presented toward the end of the lever 290 in order that the interlocking rod 44 may be pushed down.

But as above explained, a further condition is necessary before resetting can occur. The lever 251 being connected by the bell crank lever 293 is normally obstructed by the mutilated gear mechanism shown in Fig. 12. The obstructing arm 302 must be removed before the interlocking rod 44 can be moved downward. This necessitates starting of the motor and running the mechanism idle for seven turns before resetting can be accomplished.

It is here to be noted that each time that the gear sector 378 is tripped out of engagement with the restoring pinion 383, the mutilated gear 297 is also tripped out of engagement with the restoring skew pinion 104 and it drops back to zero position so that seven idle turns are required before it is restored to the normal position.

The spacing of the cams on the controlling shaft 270, to which is attached the controlling handle 9, is such that in order to bring the notch 296 in the cam 285 to register with the arm 290 of the lever 251, the motor must be started and the trap doors swung into the open position. It is also necessary that the handle 9 remain in the downward position in order to maintain the notch 296 and the arm 290 in register. After moving the handle 9 downward to start the motor and open the trap doors and bring the notch in the controlling cam to the proper position, the operator pulls the resetting knob outward in order to cause the end of the arm 295 to engage the blank portion of the mutilated gear 297 and to hold it in such position that, as the mutilated gear is restored to normal position by turning of the skew pinion 104, the obstructing arm will be brushed aside and the notch 306 in the mutilated gear will be brought opposite the end of the arm 295. Just as this notch is brought into register with the end of the arm, the restoring pinion 383 will have brought the gear sector 378 back to normal position and will trip the detent 366 away from the stop 357, and will thereby allow the spring 328 to rotate the switch shaft until the same is stopped by engagement of the stop 358 with the finger 359. This movement opens the motor switch and stops the operation of the motor.

During the time that the mutilated gear 297 and the gear sector 378 are being restored to their normal position, the driving ratchet 343 which normally engages the winding pawl 344 mounted on the winding ratchet 338, moves the winding ratchet around a full turn in such a direction as to wind the spring. The motion necessary to cause the restoration of the mutilated gear and of the gear sector 378 is slightly more than sufficient to give a full turn to the winding disk 338, but as soon as it has received a complete turn the pin 350 on the pawl 344 engages the sloping surface of the cam 347 and is tripped successively across the teeth of the driving ratchet to prevent overwinding of the spring. It will be seen from the above that the interlocking mechanism operates in unison with the switch controlling mechanism and that interlocking can be accomplished only by operations which must be performed while the motor is running, and which can be completed only when the parts are restored to predetermined position, the motor is stopped, the trap doors open and the coin pan empty.

The interlocking mechanism of the coin evaluating mechanism and the overhead register is complete within the registering mechanism, that is to say, the part which is removable from the motor base.

When the registering mechanism is raised off the base, the spring 310 (see Fig. 12) thrusts the end of the arm 295 downward by a slight camming action of the teeth of the mutilated gear against the teeth of the skew pinion 104 thereby disengaging the mutilated gear and the pinion 104 and allowing the mutilated gear to snap back to zero position where the solid portion of the periphery of the mutilated gear 297 lies in front of the interlocking arm 295 of the interlocking bell crank 293. Thus, if any attempt is made to interfere with the restoring operation preparatory to resetting the trip register, such interference will merely result in rendering the interlocking means active to prevent resetting of the overhead register.

In a center entrance or single end car, the registering mechanism need not be removed from the motor base, as the motor base is swung through 180° upon the supporting foot so that the registering mechanism faces the other side.

In a double ended car the motor base mechanism at each end is provided with a cover 413 pivoted upon the top section 254 of the motor base casing. This cover is held over the top of the motor base by a spring 414 to exclude dust from the motor base when the same is not in use.

It is to be understood that for a double ended car it is unnecessary to provide the swinging foot 8 as the position of the motor base 2 need not be changed.

The broad function of the resetting interlock is to insure proper handling of the coins and the mechanism. The machine will be operable in such manner only, that improper operation can be detected at once. Such conductors as are inclined to be dishonest are thus prevented or deterred from defrauding the public or the service company. The particular conditions under which improper conduct might be possible are as follows: On lines that run out into sparsely settled districts, the regular conductor knows everybody living in his district and it would be an easy matter for him to leave a few coins on the trap doors on the last part of his outgoing trip and then on the return trip if he sees only the people he knows in the car, he can intercept in making change an equal number of fares, and having reset the register at the end of the line with the coins mentioned as left on the doors, from the last trip, he will be able to come up to the first transfer point or such points where an inspector might board the car unnoticed, with a correct statement on the trip register, and yet he might thus have stolen several fares. The present machine prevents this, as has been explained above.

While the above description and drawings are directed to the explanation and illustration of a specific embodiment of my invention, it is not intended to limit the invention to the form, dimension and proportion shown, as the above description and illustration is not to be taken as limiting but as explanatory.

It will be understood that while the above machine is constructed to register coins of a given monetary system, it is not intended to limit the invention to the registration of coins of one system or of particular denominations only, or of coins only, as the principles of the invention apply broadly to handling articles or tokens of any desired type or significance.

I claim:

1. In a fare register in combination a receptable for tokens, power-driven token evaluating mechanism, a register operated thereby, resetting means for said register, and interlocking means controlling resetting so that all tokens in the receptacle must be registered before the register can be reset.

2. In combination token evaluating and registering mechanisms, separable power means for operating said mechanisms, and interlocking means for preventing resetting of the registering mechanisms when separated from said power means.

3. In combination, token evaluating mechanism, for registering tokens of different denominational values upon a suitable register in units directly proportional to their denominational values, an electric motor for operating said mechanism, a switch for said motor, manual means for closing said switch, automatic means for opening said switch, and means controlled by a token in said token evaluating mechanism for delaying the operation of said automatic means.

4. In combination, a token receiving hopper for receiving indiscriminately tokens of different denominational values, token evaluating mechanism, token feeding mechanism for feeding tokens from said hopper to said evaluating mechanism, token register mechanism for registering the tokens in units directly proportional to their denominational values, a driving motor for driving said evaluating mechanism and said feeding mechanism coin-controlled governing means for said motor and a driving connection between said motor and said evaluating mechanism, said driving connection including a spring clutch.

5. In combination, a hopper for receiving tokens in bulk, an evaluating mechanism, token feeding mechanism for feeding the tokens one at a time from said token hopper to said evaluating mechanism, a token register controlled by said evaluating mechanism, a driving motor, a rotary switch, manual means for causing rotation of said switch for part of a revolution to close the circuit of the driving motor, and automatic means for causing rotation for another part of a revolution to open the circuit of said motor.

6. In combination, a token hopper for receiving indiscriminately tokens of different denominational values, token evaluating mechanism for registering said tokens in units directly proportional to their denominational values, a trap door between said hopper and said evaluating mechanism, a motor for operating said evaluating mechanism, a switch for said motor, a handle for operating said trap door, said handle operatively controlling said switch.

7. In combination, a token inspection chamber having an opening through the bottom thereof, a trap door at said opening, means for holding said trap door in the normally closed position, a handle for operating said trap door, evaluating mechanism for receiving indiscriminately tokens of different denominational values from said inspection chamber, token registering mechanism controlled by said evaluating mechanism for registering the tokens in units directly proportional to their denominational values, a driving motor for said evaluating mechanism, a normally open switch for said motor and a connection from said switch to said handle, whereby operation of the handle opens the trap doors and closes the switch.

8. In combination, token evaluating mechanism, a token register, resetting means for said register, a motor for said evaluating mechanism, a switch for closing the circuit of said motor, and means for preventing the operation of said resetting means until said switch is operated.

9. In combination, a token receiving and inspection chamber having an aperture through the bottom thereof, a trap door at said bottom, token evaluating mechanism for receiving tokens from said inspection chamber, a token register, resetting means for said register, a motor for driving said evaluating mechanism, a switch controlling the circuit of said motor, a handle connected to said trap door and said switch, and means for preventing operation of said register resetting means until after said handle is operated to open the trap door and to close the switch.

10. In combination, a token receiving and inspection chamber, a trap door at the bottom of said chamber, token evaluating mechanism for receiving tokens from said chamber, token register mechanism controlled by said evaluating mechanism, resetting means for said register, a motor for operating said evaluating means, a switch controlling the circuit of said motor, a handle connected to said switch and to said trap door, and means controlled by said handle and by said evaluating mechanism for preventing the operation of said resetting means.

11. In combination, a token receiving and inspection chamber, a trap door for said chamber, token evaluating mechanism, a token register controlled by said evaluating mechanism, resetting means for said register, a motor for operating said evaluating means, a switch for said motor, a handle for operating said switch and said trap door, and means controlled by said handle and by the coins passing through said evaluating mechanism for preventing the operation of said resetting means.

12. In combination, token evaluating mechanism, a token register operated by said evaluating mechanism, a motor base for supporting said evaluating mechanism, a motor in said base, a switch in said base for said motor, a separable driving connection between said motor and said evaluating mechanism, and a separable switch controlling connection between said evaluating mechanism and said motor base.

13. In combination, token evaluating mechanism, a token register, a column for supporting said token register from said token evaluating mechanism, a driving connection in said column between said evaluating mechanism and said register, a separable motor base for supporting said token evaluating mechanism, a driving motor for said evaluating mechanism in said base, a switch for said motor in said base, a separable driving connection between said motor and said token evaluating mechanism, and a separable switch controlling connection between said token evaluating mechanism and said switch.

14. In combination, token evaluating mechanism, a token register supported thereby and adapted to be operated by said evaluating mechanism, a separable motor base for supporting said token evaluating mechanism, a motor for said evaluating mechanism in said base, a switch for said motor in said base, a separable driving connection between said motor and said evaluating mechanism, a token hopper, inspection mechanism for said hopper, a handle for operating said inspection mechanism, and a separable connection between said handle and said switch.

15. In combination, a token hopper, means in said token hopper for intercepting tokens for inspection, token evaluating mechanism, token registering mechanism, a separable motor base for said token evaluating mechanism, a motor in said base, a switch for said motor in said motor base, a separable driving connection between said motor and said evaluating mechanism, a controlling handle for operating said trap door, and a separable connection between said handle and said switch.

16. In combination, token evaluating mechanism, a token register supported by said evaluating mechanism, and operated thereby, a separable motor base for said evaluating mechanism, a motor in said base, a switch in said motor base, a separable driving connection between said motor and said evaluating mechanism, a separable switch controlling connection between said evaluating mechanism and said switch, and means in said motor base for controlling said switch.

17. In combination, token evaluating mechanism, a token register supported by said evaluating mechanism and connected thereto, a separable motor base for said evaluating mechanism, a motor in said base, a switch for said motor in said motor base, a separable driving connection between said motor and said evaluating mechanism, a separable connection between said evaluating mechanism and said motor base for closing said switch and means in said motor base for opening said switch.

18. In combination, token registering means, a separable motor base for said token registering means, a motor in said motor base, a switch in said motor base, means in said motor base for opening said switch, and a connection between said registering means and said motor base to delay opening of said switch, said means being controlled by the registration of a token.

19. In a fare register, a hopper for receiving indiscriminately tokens of different denominational values, a trap door for said hopper, a handle for operating said trap door, registering means for registering the tokens in units directly proportional to their denominational values, a motor for driving said registering means, a switch for said motor and a connection between said handle and said switch.

20. In a fare register, a hopper for receiving tokens, a trap door for said hopper, a handle for operating said trap door, rotary carrying means for receiving the tokens from said hopper, a separable motor base, a motor in said base, a separable connection between said motor and said rotary carrying means, a switch in said motor base for controlling said motor, and a separable connection between said handle and said switch.

21. In combination, a token evaluating mechanism, a trip register operated by said evaluating mechanism and supported thereby, a separable motor base for supporting said evaluating mechanism, interlocking means for said trip register for preventing resetting of the same when said evaluating mechanism is separated from said motor base.

22. In combination, a token evaluating mechanism, a register operated thereby, resetting mechanism for said mechanism, a separable motor base for supporting said evaluating mechanism, a motor in said motor base for operating said evaluating mechanism and means for preventing the operation of said register resetting means when said motor is disconnected from said evaluating mechanism.

23. In combination, a hopper for receiving tokens, a register, resetting mechanism for the register, token evaluating means for operating the register, a trap door for said hopper, a handle for operating said trap door and means to prevent resetting of said register when said trap door is closed.

24. In combination, a hopper for receiving tokens, a register, evaluating means for receiving tokens from said hopper and registering the same upon said register, resetting means for said register, a trap door for said hopper, means for opening said trap door and means for preventing closing of said trap door while said resetting means is active to reset the register.

25. In combination, a token register, resetting means for said register, evaluating means for operating said register, a motor for actuating said evaluating means and means to prevent operation of said register resetting means until said motor has driven said evaluating mechanism through a predetermined degree of motion.

26. In combination, a register, token evaluating means for operating said register, a driving motor for said token evaluating means, a switch for said motor, means for closing said switch, means for opening said switch, said latter means being controlled by said evaluating means to open the switch only after a predetermined amount of motion of said evaluating means after a token has been registered.

27. In combination a token register, token evaluating means, a motor for operating said evaluating means, a switch for said motor, manual means for closing said switch to start the motor and means controlled jointly by the motor and by the token passing through said evaluating means for opening said switch to stop the motor.

28. In combination, token registering mechanism comprising a token register and token evaluating means for operating said register, a separable motor base, said motor base containing a motor for driving said evaluating mechanism, resetting means for said token register, means to prevent operation of said resetting means when said coin registering mechanism is removed from said separable base and means to render said resetting means operable upon restoring said token registering means to said base and transmitting a predetermined degree of movement from said motor to said evaluating means.

29. In combination, a token receiving hopper, a token registering means, a trap door for said hopper, a motor for driving said token registering means, a switch for said motor, a controlling handle, a shaft operated by said handle, means for operating said trap door and cam means on said shaft for controlling said switch.

30. In combination, token evaluating means, token registering means operated thereby, means for resettting said register, a motor for operating said evaluating means, controlling means normally disabling said resetting means, controlling means for said motor and means for simultaneously stopping said motor and releasing said resetting means.

31. In combination, token evaluating mechanism, token registering mechanism, a driving motor for said token evaluating mechanism, motor controlling means, manual means for operating said controlling means to start said motor resetting mechanism for said token register and a delayed control for said resetting mechanism.

32. In combination, token evaluating mechanism, a token register operated thereby, a motor, a driving connection between said motor and said mechanism, motor switch, controlling means, manual means for operating said controlling means, resetting means for said token register, automatic mechanism for sotpping said motor and coin controlled delay mechanism governing said automatic stopping mechanism.

33. In combination, token evaluating means, token registering means operated thereby, a motor, a driving connection between said motor and said mechanism, a motor switch, manual means for closing said motor switch, delay controlled normaling mechanism governing said resetting means, automatic restoring mechanism for opening said motor switch and delay controlled mechanism governing the operation of the restoring mechanism, said normaling mechanism being controlled by the registration of a token.

34. In combination, a token registering mechanism, comprising a token evaluating mechanism, a token register operated thereby, a separable motor base, a driving motor, a separable driving connection between said motor and said token evaluating mechanism, a motor switch in said motor base, a handle on said token registering mechanism, a separable connection between said handle and said motor switch, resetting mechanism for said token register, token delayed normaling mechanism governing said resetting mechanism, automatic restoring mechanism for said motor switch and coin delayed mechanism governing said restoring mechanism.

35. In combination, a hopper for receiving indiscriminately tokens of different denominational values, a register for registering tokens in units directly proportional to their denominational values, governing means for said register, said governing means being controlled by said tokens, a motor for operating said register in accordance with the tokens that act upon said governing means, an operating circuit for said motor, and means controlled by the tokens that act upon said governing means for controlling said operating circuit.

36. In combination, token evaluating mechanism, token registering mechanism, resetting mechanism for said token registering mechanism, said resetting mechanism having a locking element requiring a preliminary unlocking movement, a blocking element normally preventing said movement of the locking element, said blocking element being movable into position to release said locking element, a connection between said token evaluating mechanism and said blocking element to produce said movement, said blocking element having a further blocking means.

37. In combination, token evaluating mechanism, token registering mechanism, resetting mechanism for said register mechanism, locking means for said token register mechanism, an interlocking connection movable with said locking means, a blocking element normally out of register with said interlocking connection and preventing operation of the same, means controlled by movement of said token evaluating mechanism for bringing said element into register and means carried by said blocking means for blocking said interlocking connection when said blocking element and said interlocking connection are in register.

38. In combination, token evaluating mechanism, token registering mechanism, resetting mechanism for said register mechanism, locking means for said registering mechanism, an interlocking connection movable with said locking means, a blocking element normally out of register with said interlocking connection and preventing operation of the same, a motor for said token evaluating mechanism, a switch for said motor, means controlled by movement of said token evaluating mechanism for bringing said interlocking connection and said blocking means into register and for simultaneously opening said switch, and means carried by said blocking means for blocking said interlocking connection when said blocking element and said interlocking connection are in register, and means controlled jointly by said interlocking connection, and movement of said token evaluating mechanism to move said latter means out of blocking position.

39. In combination, token evaluating mechanism, token registering mechanism, resetting mechanism for said registering mechanism, blocking means for said resetting mechanism, an interlocking connection movable with said locking means, a motor for operating said token evaluating mechanism, a switch for controlling said motor, token controlled blocking means to prevent movement of said interlocking connection, and means for simultaneously opening said switch and disabling said blocking means.

40. In combination, token evaluating mechanism, a token register, resetting means for said token register, a motor for said token evaluating mechanism, a switch for controlling said motor, delay controlled means to prevent resetting of said token register, and means for simultaneously opening said switch and disabling said preventing means.

41. In combination, token evaluating mechanism, token registering mechanism, resetting mechanism for said registering mechanism, a motor for operating said token evaluating mechanism, a switch for controlling said motor, manual means for closing said switch before said resetting mechanism is active to reset said registering mechanism.

42. In combination, token evaluating mechanism, token registering mechanism, resetting mechanism for said token registering mechanism, an interlocking connection controlling said resetting mechanism, a blocking element geared to said evaluating mechanism, said blocking element normally preventing operation of said resetting mechanism by blocking said interlocking connection, and means controlled jointly by said resetting mechanism, and by movement of said blocking element for disabling said blocking element to permit of resetting of said register.

43. In combination, token evaluating mechanism, token registering mechanism, resetting mechanism for said registering mechanism, an interlocking connection for preventing operation of said resetting mechanism, a blocking element geared to said token evaluating mechanism, a notch in said blocking element to permit movement of said interlocking connection and token controlled means for moving said notch out of register with said interlocking connection.

44. In combination, token evaluating mechanism, token registering mechanism, resetting mechanism for said register, a movable arm connected to said resetting mechanism, a blocking element having a cut-away portion adapted to be brought to register with said arm to permit resetting of said register, an operating connection between said evaluating mechanism and said blocking element to bring said cut-away portion into register and means controlled by the registration of a token for moving said cut-away portion out of register.

45. In combination, token evaluating means, a token register, resetting means for the register, a movable arm connected to said resetting means, a blocking disk having a cut-away portion adapted to be brought into register with said arm, a gear for moving said disk to bring said cut-away portion into register and a spring held arm connected to said disk and adapted to block said cut-away portion.

46. In combination, token evaluating mechanism, token registering mechanism, resetting mechanism for said token registering mechanism, a swinging interlock arm connected to said resetting mechanism, a driving gear connected to said token evaluating mechanism, a bell crank lever, a blocking disk mounted on one end of said bell crank lever, a spring for moving said disk to blocking position, gear means connecting said blocking disk and said driving gear, and means controlled by the registration of tokens to disengage said gear and said driving gear.

47. In combination, token registering mechanism, a separable motor base, a suitable driving motor, said token registering mechanism comprising token evaluating mechanism, a token register, resetting means for said register, blocking means for blocking said register resetting means, means controlled by said resetting means and said evaluating means jointly for disabling said blocking means, and means controlled by separation of said token registering mechanism from said motor base for rendering said blocking means active.

48. In combination, a rotary token carrying element, a gear connected to said element, an interlocking arm, a bell crank lever having a blocking disk pivoted on one end thereof, said disk having gear means connected therewith, a gear connected with said token carrying element, said locking element having a notch in the periphery thereof adapted to be brought into register with said interlocking arm and means for moving said bell crank lever to disengage said gear means from said gear.

49. In combination, a blocking element having a notch in the periphery thereof, an interlocking arm, means for moving said element to bring said notch into line with said arm, token controlled means to disengage said means and said element and spring means for moving said element to bring said notch out of register with said arm.

50. In combination, a blocking disk having gear teeth connected therewith, a spring for said disk, a gear adapted to be held in register with said gear teeth by said spring, a swinging arm, said disk having a notch or cut-away portion therein adapted to be brought into register with said swinging arm, and means for moving said gear teeth out of engagement with said gear whereby said spring is enabled to move said notch out of register with said arm.

51. In combination, a blocking disk having a notch in the periphery thereof, an interlocking arm adapted to register with said notch, a bell crank lever, said disk being journaled on one end of said lever, an obstructing arm, a spring for holding said arm in front of said notch, a spring for resisting rotation of said disk, gear means for rotating said disk against said spring to bring said notch into register with said arm, and means connected to the other end of said bell crank lever for disengaging said gear means.

52. In combination, a motor, a switch, a switch shaft for operating said switch, a spring for said shaft, escapement means, manually operated means for causing operation of said escapement to close said switch, coin controlled means for governing said escapement, and automatic means to wind said spring.

53. In combination, a motor, a switch, a shaft for said switch, a spring for said shaft, an escapement for said shaft, manual means for causing operation of said escapement to close said switch, automatic means to wind said spring, means operated by said winding means to operate said escapement to open said switch and coin controlled means for governing said latter means.

54. In a token register, token evaluating and registering means, a motor for operating said evaluating and registering means, a switch for said motor, a switch shaft, a spring for said shaft, an escapement for said shaft, manual means for causing operation of said escapement to close said switch, and means controlled by said evaluating and registering means to operate said escapement to open said switch.

55. In combination, token evaluating and registering mechanism, a motor for operating said mechanism, a switch for said motor, a shaft for said switch, a spring for said shaft, an escapement for permitting said spring to move said shaft, manual means for operating said escapement to close said switch, automatic means to wind said spring, and means jointly controlled by said evaluating and registering means, and by said winding means to operate said escapement to open said switch.

56. In combination, token evaluating and registering mechanism, a motor for operating said mechanism, a switch for said motor, automatic means for opening said switch after a predetermined movement of said evaluating mechanism, and means for delaying the operation of said automatic means, said latter means being controlled by the registration of tokens.

57. In combination, token evaluating and registering mechanism, a motor for operating said mechanism, a rotary switch, a spring for operating said rotary switch, manual means for causing said spring to close said switch and automatic means for opening said switch after a predetermined movement of said evaluating mechanism.

58. In combination, token evaluating and registering mechanism, a motor for operating said mechanism, a rotary switch, a spring for operating said rotary switch, manual means for causing said spring to close said switch, manual means for causing said spring to open said switch after a predetermined movement of said evaluating mechanism, and token controlled means for delaying the operation of said automatic means.

59. In combination, token evaluating and registering mechanism, a motor, a rotary switch, a spring for operating said rotary switch, manual means for causing said spring to close said switch, automatic means for winding said spring, means for causing said spring to open said switch after a predetermined movement of said evaluating mechanism, said means being controlled by the registration of tokens for delaying the operation thereof.

60. In combination, token evaluating and registering mechanism, a motor for operating said mechanism, a rotary switch, a spring for operating said switch, automatic means for winding said spring, means for causing said spring to open said switch when said spring is wound, and token controlled means for disabling said means.

61. In combination, token evaluating and registering mechanism, a motor, a rotary switch, a spring for operating said rotary switch, automatic means for winding said spring, a slippage clutch between said automatic means and said motor, and means for causing said spring to open said switch after a predetermined movement of said evaluating mechanism.

62. In combination, token evaluating and registering mechanism, a motor, a rotary switch for said motor, a spring for operating said rotary switch, automatic means for winding said spring, a slippage clutch between said motor and said automatic means, delay controlled means for causing said spring to open said switch only when said spring is wound and restarting means for said delay controlled means, said restarting means being governed by the registration of a token.

63. In combination, token evaluating and registering mechanism, a motor for operating said mechanism, a rotary switch for said motor, a spring for operating said rotary switch, escapement means for said spring for opening and closing said switch, manual means for operating said escapement to close said switch, automatic means to wind said spring and automatic means controlled by said evaluating means for opening said switch.

64. In combination, token evaluating and registering mechanism, a motor for driving said mechanism, a rotary switch, a spring for operating said rotary switch, escapement means for said spring for opening and closing said switch, manual means for operating said escapement to close said switch, automatic means to wind said spring, automatic means to open said switch, means controlled by said token evaluating and registering mechanism for delaying the operation of said automatic switch opening means and means to prevent overwinding of said spring.

65. In combination, a switch shaft, a rotary switch element on said shaft, an escapement disk having stops thereon, said disk being connected to said shaft, escapement means coöperating with said disk to permit intermittent motion of said shaft, coin controlled means governing said escapement means, a coil spring for moving said shaft and disk, a rotating element for winding said spring, and a slippage clutch between said rotary element and the end of said spring.

66. In combination a switch shaft, a switching element secured to the end of said shaft, a coil spring connected to said shaft for rotating the same, escapement means for alternately opening and closing said switch, coin controlled means governing said escapement means, a driven sleeve on said shaft and means connecting said sleeve and the end of said spring for permitting a predetermined degree of winding of said spring.

67. In combination a driving motor, a rotary switch, a shaft for said switch, escapement means connected to said shaft, a coil spring connected to said shaft, a motor controlled by said switch, means to operate said escapement to close said switch, a connection between said motor and said spring to rewind said spring, means operated by movement of said rewinding means to open said switch and coin controlled means governing said latter means.

68. In combination, a switch, a shaft for operating said switch, escapement mechanism for permitting a predetermined movement of said switch shaft, a motive spring for said shaft, means for winding said motive spring, said means being connected to said motor, delay controlled means for operating said escapement mechanism to open said switch and coin controlled means governing said delay controlled means.

69. In combination, a switch, a motor controlled by said switch, a shaft for operating said switch, a motive spring for said shaft, escapement means for permitting said shaft to open and close said switch, winding means connected to said motor for winding said motive spring, a slippage clutch between said winding means and said spring, means for operating said escapement to open said switch, delay controlled means governing said operating means and coin controlled means governing said delay controlled means.

70. In combination a receptacle for tokens, token evaluating mechanism, a register operated by the same, a motor for driving said mechanism, resetting means for said register and interlocking means controlling resetting so that all tokens in said receptacle must be registered before said register can be reset.

71. In a fare register, means for receiving coins or tokens, registering means for registering coins or tokens according to their value, a motor for driving said registering means, starting and stopping control means for said motor and means for postponing action of said stopping control means so long as there are coins or tokens unregistered in said receiving means.

72. In combination, token evaluating mechanism, a temporary register, means for resetting said register, a motor for operating said evaluating mechanism, manual means for starting the motor and a lock for the resetting mechanism which lock may be unlocked only by starting the resetting operation when the motor is in operation.

73. In combination token evaluating mechanism, a temporary register, means for resetting said register, a motor for operating said evaluating mechanism, manual means for starting the motor, automatic means for stopping the motor and resetting control means rendering inoperative the resetting mechanism unless resetting is commenced while the motor is running and finished after the motor is stopped automatically.

74. In a fare register, a hopper, mechanism for registering on the register the value of the coins or tokens deposited in said hopper, all of said mechanism being combined in one unit, driving mechanism and control for the same in another unit with separable connecting means and automatic means within the second unit for stopping the driving mechanism.

In witness whereof, I hereunto subscribe my name this 11th day of August A. D. 1916.

ARTHUR H. WOODWARD.